(12) United States Patent
Chou

(10) Patent No.: US 11,815,663 B2
(45) Date of Patent: *Nov. 14, 2023

(54) PHOTOGRAPHING MODULE AND ELECTRONIC DEVICE

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,468

(22) Filed: Mar. 14, 2022

(65) Prior Publication Data

US 2022/0196991 A1 Jun. 23, 2022

Related U.S. Application Data

(63) Continuation of application No. 16/846,618, filed on Apr. 13, 2020, now Pat. No. 11,307,389, which is a (Continued)

(30) Foreign Application Priority Data

Feb. 5, 2016 (TW) .................................. 105202129

(51) Int. Cl.
*G02B 13/00* (2006.01)
*G02B 7/02* (2021.01)
(Continued)

(52) U.S. Cl.
CPC .......... *G02B 13/0045* (2013.01); *G02B 7/021* (2013.01); *G02B 7/003* (2013.01); *G02B 27/0018* (2013.01)

(58) Field of Classification Search
CPC .... G02B 13/0045; G02B 7/003; G02B 7/021; G02B 27/0018; G02B 3/04;
(Continued)

(56) References Cited

U.S. PATENT DOCUMENTS 3,562,513 A 2/1971 Jaffe, Jr. et al.
4,506,951 A 3/1985 Yamada
(Continued)

*Primary Examiner* — Jie Lei
(74) *Attorney, Agent, or Firm* — McClure, Qualey & Rodack, LLP

(57) ABSTRACT

A photographing module includes an imaging lens assembly. The imaging lens assembly includes a plurality of lens elements, wherein one of the lens elements is a plastic lens element. At least one surface of an object-side surface and an image-side surface of the plastic lens element includes an effective optical portion and a peripheral portion. The peripheral portion surrounds the effective optical portion, and includes a plurality of rib structures, a first fitting section and an isolation section. Each of the rib structures has a strip shape along a radial direction of an optical axis of the imaging lens assembly, and the rib structures are arranged around the effective optical portion. The first fitting section surrounds the effective optical portion, and is connected to another one of the lens elements adjacent to the surface. The isolation section is disposed between the rib structures and the first fitting section.

8 Claims, 24 Drawing Sheets

Related U.S. Application Data continuation of application No. 16/390,177, filed on Apr. 22, 2019, now Pat. No. 10,656,392, which is a continuation of application No. 15/996,769, filed on Jun. 4, 2018, now Pat. No. 10,317,648, which is a continuation of application No. 15/155,160, filed on May 16, 2016, now Pat. No. 10,018,808.

(51) Int. Cl.
*G02B 7/00* (2021.01)
*G02B 27/00* (2006.01)

(58) Field of Classification Search
CPC .... G02B 27/0025; G02B 1/041; G02B 13/00; G02B 7/00; G02B 7/02; G02B 27/00; G02B 5/0278; G03B 11/04
USPC .......................................... 359/601, 611, 740
See application file for complete search history.

(56) References Cited

U.S. PATENT DOCUMENTS

| | | |
|---|---|---|
| 6,819,508 B2 | 11/2004 | Chiang |
| 7,209,301 B2 | 4/2007 | Chao |
| 7,530,699 B2 | 5/2009 | Shulepova et al. |
| 8,842,376 B2 | 9/2014 | Yang et al. |
| 8,908,282 B2 | 12/2014 | Yang et al. |
| 9,091,801 B2 | 7/2015 | Huang |
| 10,018,808 B2 | 7/2018 | Chou |
| 10,317,648 B2 | 6/2019 | Chou |
| 10,656,392 B2 | 5/2020 | Chou |
| 11,307,389 B2 * | 4/2022 | Chou ................ G02B 13/0045 |
| 2007/0268599 A1 | 11/2007 | Lee et al. |
| 2011/0279913 A1 | 11/2011 | Watanabe |
| 2012/0218649 A1 | 8/2012 | Konishi et al. |
| 2013/0258503 A1 * | 10/2013 | Lu ....................... B23K 26/242 219/121.64 |
| 2014/0204476 A1 | 7/2014 | Yoshiyuki et al. |
| 2016/0011415 A1 | 1/2016 | Takada |

* cited by examiner

PHOTOGRAPHING MODULE AND ELECTRONIC DEVICE

RELATED APPLICATIONS

The present application is a continuation of the application Ser. No. 16/846,618 filed on Apr. 13, 2020, U.S. Pat. No. 11,307,389, which is a continuation of the application Ser. No. 16/390,177 filed on Apr. 22, 2019, U.S. Pat. No. 10,656,392 issued on May 19, 2020, which is a continuation of the application Ser. No. 15/996,769 filed on Jun. 4, 2018, U.S. Pat. No. 10,317,648 issued on Jun. 11, 2019, which is a continuation of the application Ser. No. 15/155,160, filed on May 16, 2016, U.S. Pat. No. 10,018,808 issued on Jul. 10, 2018, and claims priority to Taiwan application serial number 105202129, filed on Feb. 5, 2016, the entire contents of which are hereby incorporated herein by reference.

BACKGROUND

Technical Field

The present disclosure relates to a photographing module. More particularly, the present disclosure relates to a photographing module which is applicable to portable electronic devices.

Description of Related Art

Due to the popularity of personal electronic products and mobile communication products having camera functionalities, such as smart phones and tablet personal computers, the demand for compact photographing modules has been increasing and the requirements for high resolution and image quality of present compact photographing modules increase significantly.

A plastic lens element is generally used to effectively reduce the manufacturing cost of the photographing module. A conventional plastic lens element is typically formed by an injection molding method and has a smooth and bright surface, which is featured with high reflectivity. Accordingly, when the stray light is reflected from the surfaces of other optical elements of the photographing module to the surface of the plastic lens element, the stray light reflected from the surface of the plastic lens element cannot be effectively attenuated and would be incident on the surfaces of lens elements of the photographing module.

Furthermore, the compact photographing module typically includes a plurality of plastic lens elements so as to enhance the image quality by the plastic lens elements featured with compact sizes, aspheric surfaces and sharp changing of curvatures. However, lens elements with compact sizes and aspheric surfaces often result in alignment problems among lens elements. To solve the problems, the technology of lens elements with the inserting structures has been developed to improve the precision of axial installation. But the complexity of the inserting structures increases the difficulties of stray light control and it becomes worse when the photographing modules have compact sizes.

Given the above, how to simultaneously meet the requirements of suppressing the stray light of the compact photographing module and alignment precision with the optical axis of the lens elements has become one of the important subjects, so that the image quality of the compact photographing modules can be enhanced, and the requirements of high-end optical systems with camera functionalities can be satisfied.

SUMMARY

According to one aspect of the present disclosure, a photographing module includes an imaging lens assembly. The imaging lens assembly includes a plurality of lens elements, wherein one of the lens elements is a plastic lens element. At least one surface of an object-side surface and an image-side surface of the plastic lens element includes an effective optical portion and a peripheral portion. The effective optical portion is aspheric. The peripheral portion surrounds the effective optical portion, and includes a plurality of rib structures, a first fitting section and an isolation section. Each of the rib structures has a strip shape along a radial direction of an optical axis of the imaging lens assembly, and the rib structures are arranged around the effective optical portion. The first fitting section surrounds the effective optical portion, and is connected to another one of the lens elements adjacent to the surface for aligning the plastic lens element with the lens element adjacent to the surface. The isolation section is disposed between the rib structures and the first fitting section. When a number of the lens elements of the imaging lens assembly is N, the following condition is satisfied: 4 N.

According to another aspect of the present disclosure, an electronic device includes the photographing module according to the foregoing aspect.

DETAILED DESCRIPTION

1st Embodiment

Figure 1A:
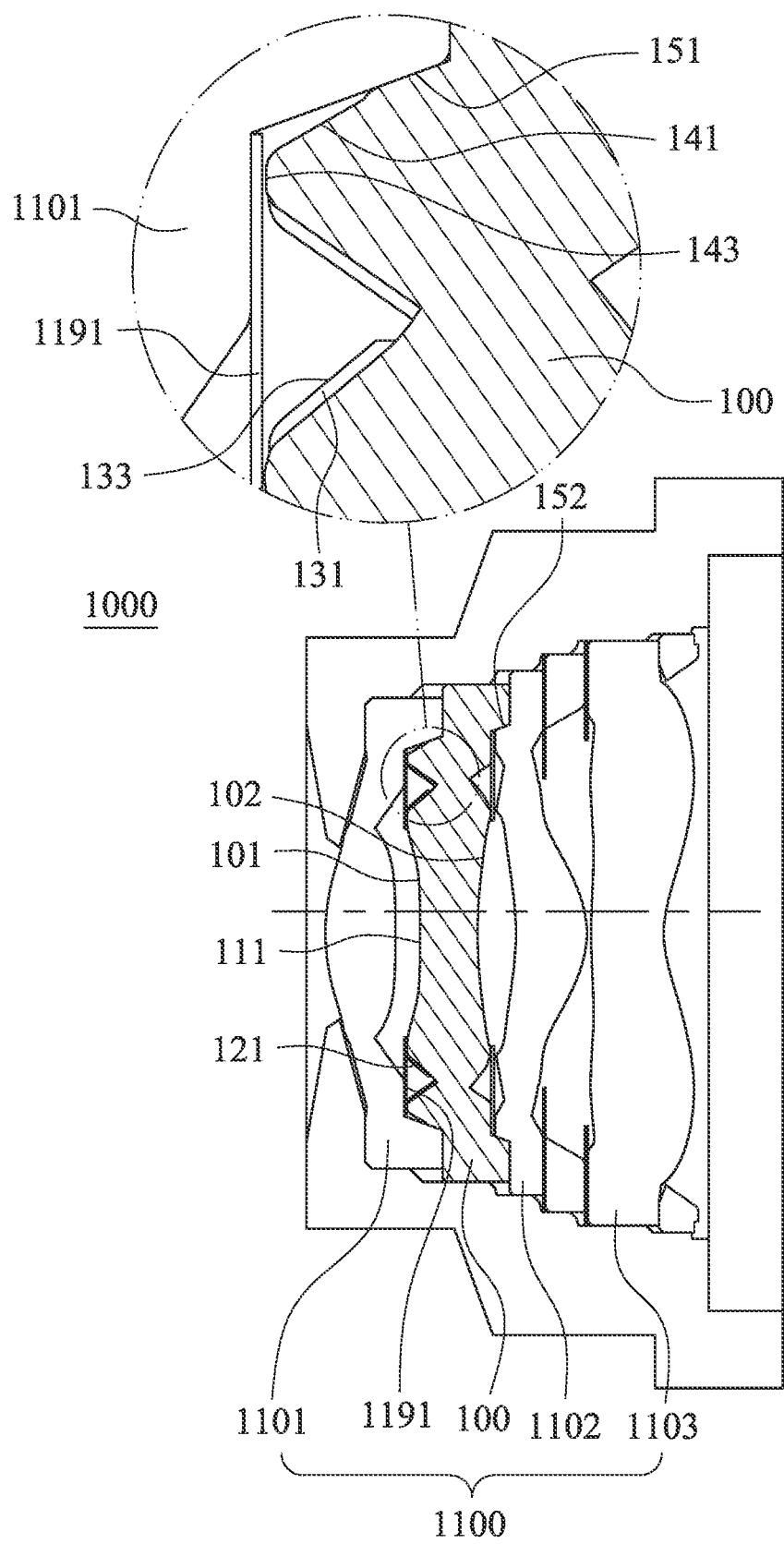
FIG. 1A is a schematic view of a photographing module according to the 1st embodiment of the present disclosure.

FIG. 1A is a schematic view of a photographing module 1000 according to the 1st embodiment of the present disclosure. In FIG. 1A, the photographing module 1000 includes an imaging lens assembly 1100. The imaging lens assembly 1100 includes a plurality of lens elements, wherein one of the lens elements is a plastic lens element 100, and at least one surface of an object-side surface 101 and an image-side surface 102 of the plastic lens element 100 (the aforementioned surface is the object-side surface 101 in the 1st embodiment) includes an effective optical portion 111 and a peripheral portion 121.

The effective optical portion 111 of the plastic lens element 100 is aspheric, wherein the incident light passes through the effective optical portion 111 and forms the image on an image surface (not shown herein). The peripheral portion 121 surrounds the effective optical portion 111, and includes a plurality of rib structures 131, a first fitting section 151 and an isolation section 141.

Figure 1B:
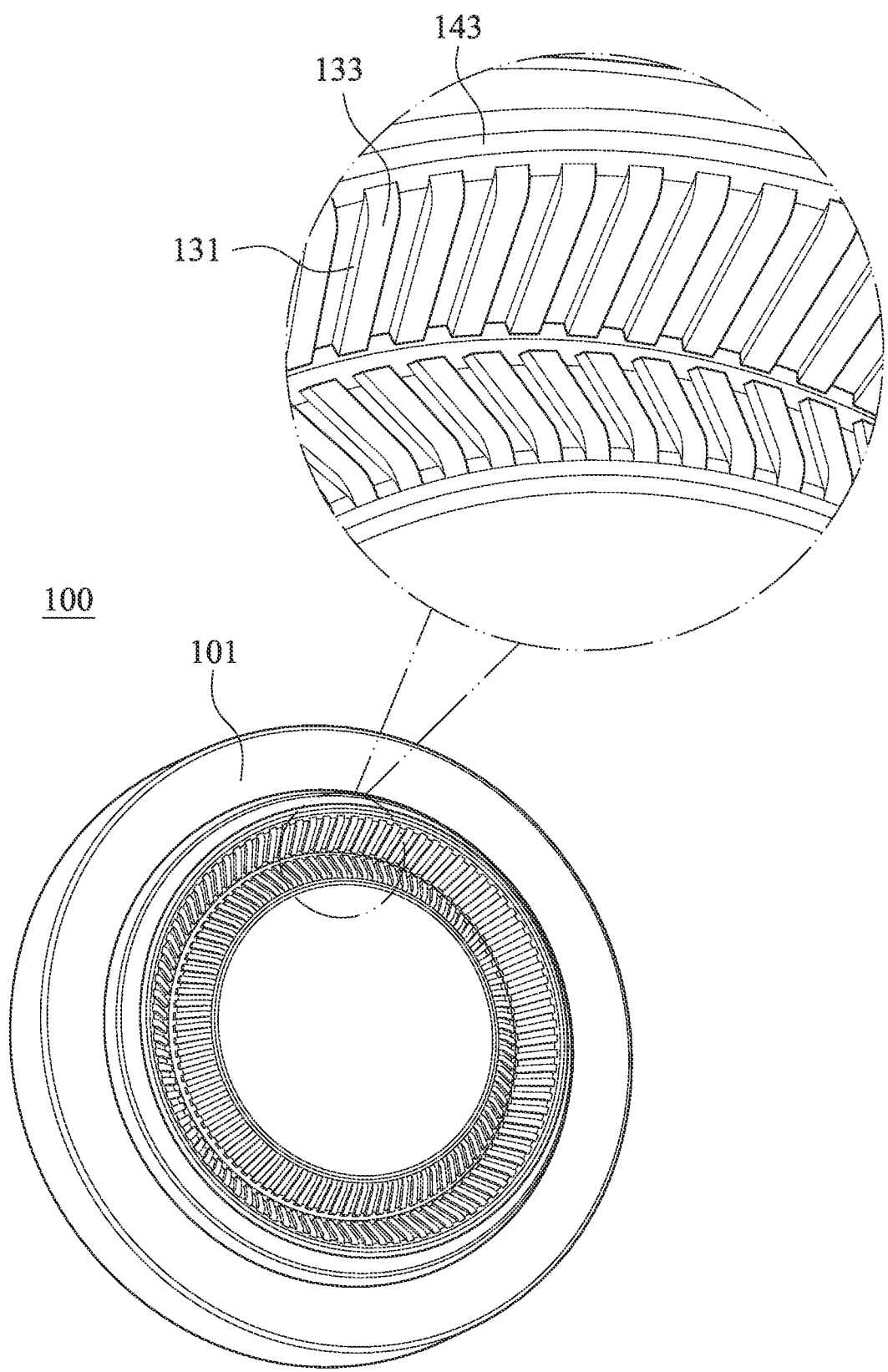
FIG. 1B is a schematic view of the plastic lens element according to the 1st embodiment.
Figure 1C:
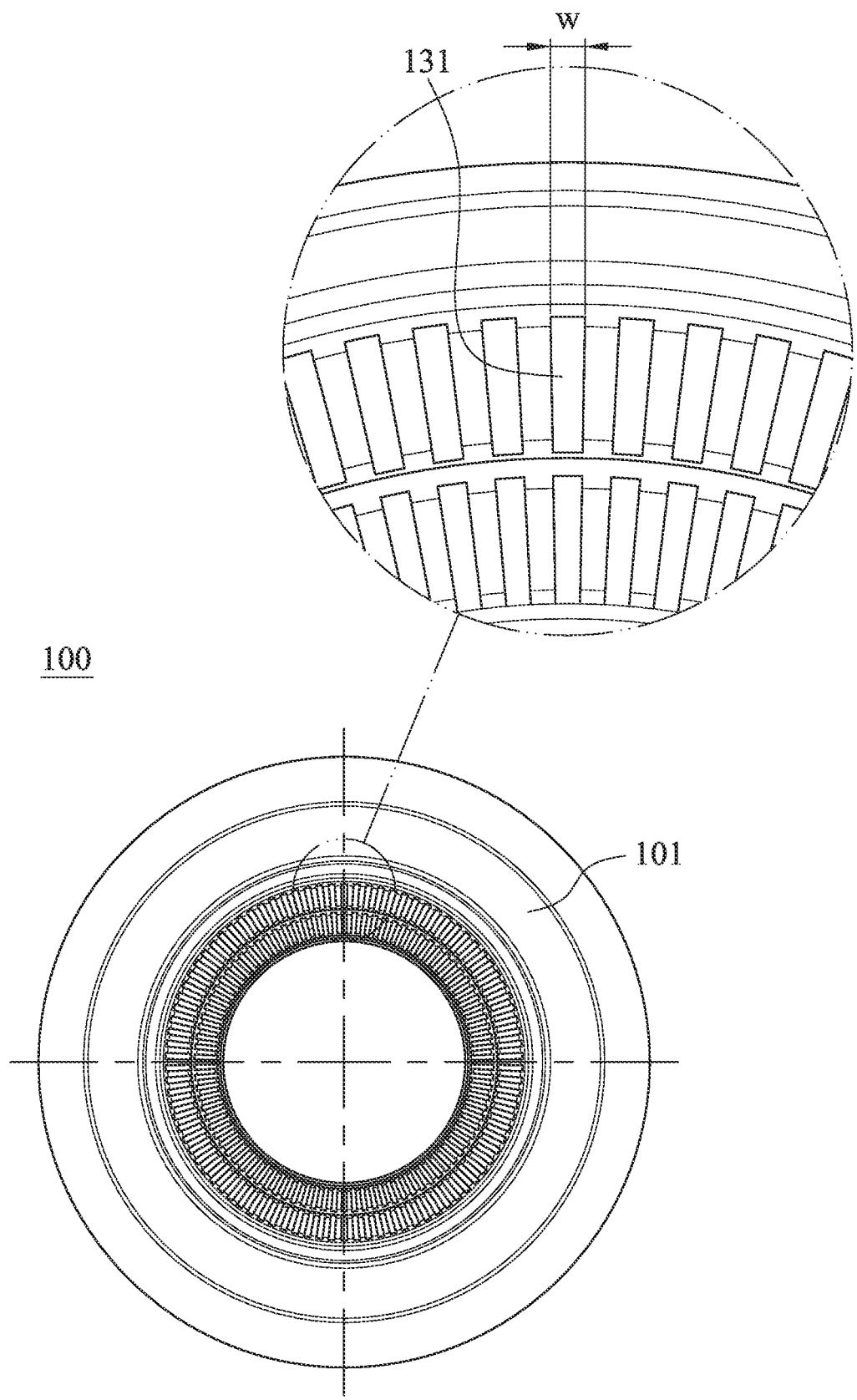
FIG. 1C is a schematic view of the parameter w of the plastic lens element according to the 1st embodiment.

FIG. 1B is a schematic view of the plastic lens element 100 according to the 1st embodiment. In FIG. 1A and FIG. 1B, each of the rib structures 131 has a strip shape along a radial direction of an optical axis of the imaging lens assembly 1100, and the rib structures 131 are arranged around the effective optical portion 111. Therefore, it is favorable for meeting the requirements of suppressing the stray light of the photographing module 1000. Furthermore, the cross-section in the radial direction of the optical axis of each of the rib structures 131 can be a triangle, a rectangle or a polygon. In the 1st embodiment, the cross-section in the radial direction of the optical axis of each of the rib structures 131 is a rectangle.

In FIG. 1A, the first fitting section 151 surrounds the effective optical portion 111, and is connected to a lens element 1101 adjacent to the object-side surface 101 for aligning the plastic lens element 100 with the lens element 1101. That is, the plastic lens element 100 and the lens element 1101 can be aligned with the optical axis of the imaging lens assembly 1100. Therefore, it is favorable for meeting the precision requirements of axial installation of the photographing module 1000.

The isolation section 141 is disposed between the rib structures 131 and the first fitting section 151. There is an air gap between the isolation section 141 and the lens element 1101, and there is another air gap between the isolation section 141 and a light blocking sheet 1191. Therefore, it is favorable for maintaining the assembling accuracy of the plastic lens element 100 with the rib structures 131. Furthermore, the rib structures 131 can be avoided too close to or extending to the first fitting section 151 by the isolation section 141, and the space accommodating the rib structures 131 and the light blocking sheet 1191 can be also maintained by the isolation section 141 so as to prevent collisions. In other embodiments (not shown herein), when two surfaces adjacent to each other of two lens elements respectively both include the rib structures, the isolation section can prevent the two lens elements from collisions and interference after assembling.

When a number of the lens elements of the imaging lens assembly 1100 is N, the following condition is satisfied: 4≤N. Therefore, it is favorable for simultaneously suppressing the stray light and enhancing alignment precision with the optical axis so as to satisfy more photographing requirements such as video, high dynamic range (HDR), imaging operation, optical zoom, fast focusing and the like. Preferably, the following condition can be satisfied: 5≤N. More preferably, the following condition can be satisfied: 5≤N<10. In the 1st embodiments, the imaging lens assembly 1100 includes, in order from an object side to an image side, the lens elements 1101, the plastic lens element 100, lens elements 1102 and 1103. The imaging lens assembly 1100 has a total of four lens elements. In other embodiments (not shown herein), the imaging lens assembly can have a total of five, six, seven or more lens elements. Furthermore, the imaging lens assembly 1100 including the plastic lens element 100 can be disposed in a barrel (its reference numeral is omitted) so as to block a lot of stray light. It is favorable for avoiding the stray light entering the portions of the lens element other than the effective optical portion and preventing from unnecessary reflection among the lens elements.

In detail, the rib structures 131 can be closer to the effective optical portion 111 than the first fitting section 151. Therefore, it is favorable for effectively blocking the stray light of the peripheral portion 121 near the effective optical portion 111.

In FIG. 1B, a number of the rib structures 131 can be greater than or equal to 80, and smaller than or equal to 480. Therefore, it is favorable for maintaining the denseness of the rib structures 131 and balancing the manufacturability so as to reflect hardly. In the 1st embodiment, the number of the rib structures 131 is 180. The rib structures 131 are divided into two groups, which are arranged in order along the radial direction of the optical axis of the imaging lens assembly 1100. That is, one group being near the optical axis and the other group being far from the optical axis are separated by a bend of the peripheral portion 121. A number of the rib structures 131 of each of the two groups is 90.

FIG. 10 is a schematic view of the parameter w of the plastic lens element 100 according to the 1st embodiment. In FIG. 10, when a greatest width of each of the rib structures 131 is w, the following condition can be satisfied: 0.01 mm<w<0.10 mm. Therefore, it is favorable for enhancing the light diminishing of the photographing module 1000 by the rib structures 131 with fine structures so as to diverge the stray light.

In FIG. 1A and FIG. 1B, each of the rib structures 131 can include a light diminishing surface 133. Therefore, it is favorable for improving quality stability of molding of the plastic lens element 100. Furthermore, the light diminishing surfaces 133 can be rough surfaces. The light diminishing surfaces 133 are transferred from the machining properties of the mold surfaces during the injection molding process, wherein the machining properties can be electrical discharge machining (EDM), sand blasting, laser related etching and the like. The light diminishing surface 133 can be located on every surfaces or a surface facing an imaged object (not shown herein) of each of the rib structures 131, and the light diminishing surface 133 can be located on at least part of areas thereof. In the 1st embodiment, the light diminishing surfaces 133 are rough surfaces and transferred from the electrical discharge machining properties of the mold surfaces during the injection molding process. Each of the light diminishing surfaces 133 is located on all area of every surfaces of each of the rib structures 131.

When a surface roughness of each of the light diminishing surfaces 133 is Ra, the following condition can be satisfied: 0.1 μm<Ra. Therefore, it is favorable for controlling the light diminishing level of the light diminishing surfaces 133.

The isolation section 141 can be a smooth surface, wherein the smoothness of the isolation section 141 is the same as or similar to the smoothness of the effective optical portion 111. Therefore, it is favorable for maintaining the assembling accuracy of the first fitting section 151.

The isolation section 141 can include an annular surface 143, wherein a normal direction of the annular surface 143 is parallel to the optical axis of the imaging lens assembly 1100. Therefore, it is favorable for reducing molding complexity of the plastic lens element 100.

In FIG. 1A, the plastic lens element 100 can be the second lens element of the imaging lens assembly 1100 in order from the object side to the image side. Therefore, it is favorable for reducing the white ghost image outside the image surface. In the 1st embodiment, the imaging lens assembly 1100 includes, in order from the object side to the image side, the lens elements 1101, the plastic lens element 100, the lens elements 1102 and 1103, wherein the plastic lens element 100 is the second lens element of the imaging lens assembly 1100 in order from the object side to the image side.

The imaging lens assembly 1100 of the photographing module 1000 can further include the light blocking sheet 1191 disposed between the plastic lens element 100 and the lens element 1101, which is adjacent to the plastic lens element 100. Therefore, it is favorable for effectively blocking stray light among the lens elements.

Figure 1D:
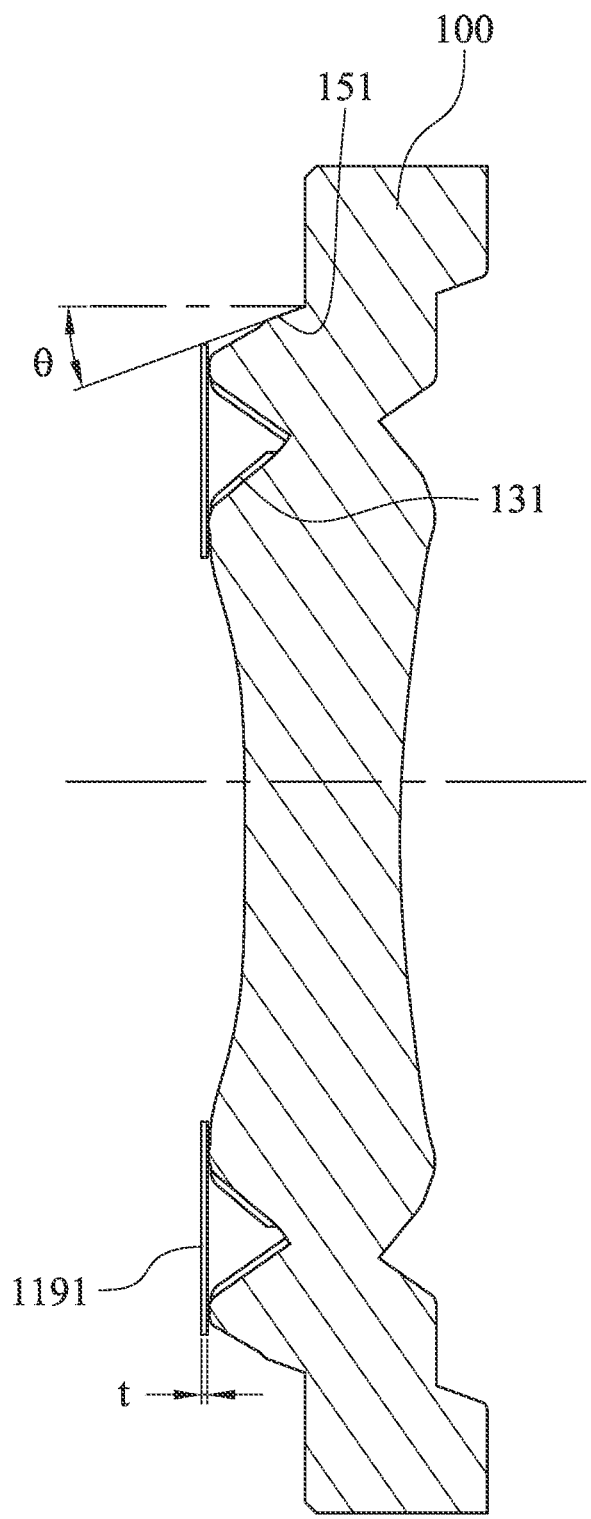
FIG. 1D is a schematic view of the parameters t and θ of the plastic lens element according to the 1st embodiment.

FIG. 1D is a schematic view of the parameters t and θ of the plastic lens element 100 according to the 1st embodiment. In FIG. 1D, when a thickness of the light blocking sheet 1191 is t, the following condition can be satisfied: 0.005 mm<t<0.05 mm. Therefore, it is favorable for reducing mechanical interference among the optical elements such as the lens element 1101, the light blocking sheet 1191 and the plastic lens element 100 by the light blocking sheet 1191 with proper thickness.

When an angle between the first fitting section 151 and the optical axis of the imaging lens assembly 1100 is θ, the following condition can be satisfied: 5 degrees <θ<35 degrees. Therefore, it is favorable for maintaining the compact size of the photographing module 1000, and obtaining the proper stress distribution required by the first fitting section 151 aligning with the optical axis.

In FIG. 1A, the other surface of the object-side surface 101 and the image-side surface 102 of the plastic lens element 100 (the aforementioned the other surface is the image-side surface 102 in the 1st embodiment) can include a second fitting section 152 connected to the lens element 1102, which is adjacent to the image-side surface 102, for aligning the plastic lens element 100 with the lens element 1102. That is, the plastic lens element 100 and the lens element 1102 can be aligned with the optical axis of the imaging lens assembly 1100. In the 1st embodiment, the first fitting section 151 and the second fitting section 152 are connected to the lens elements 1101 and 1102 respectively for the lens element 1101, the plastic lens element 100 and the lens element 1102 aligned with the optical axis of the imaging lens assembly 1100. Therefore, it is favorable for increasing the precision and the stability of the axial distance between every two of the lens elements adjacent to each other.

When an Abbe number of the plastic lens element 100 is V, the following condition can be satisfied: 10<V<25. Preferably, the following condition can be satisfied: 10<V<22. Therefore, it is favorable for effectively reducing the chromatic aberration of the photographing module 1000.

The data of the aforementioned parameters of the photographing module 1000 according to the 1st embodiment of the present disclosure are listed in the following Table 1, wherein the parameters are also shown as FIG. 10 and FIG. 1D.

TABLE 1

| 1st Embodiment | | | |
|---|---|---|---|
| N | 4 | V | 23.3 |
| Ra (μm) | 0.4~1.12 | w (mm) | 0.044 |
| t (mm) | 0.016 | θ (deg.) | 20 |

2nd Embodiment

Figure 2A:
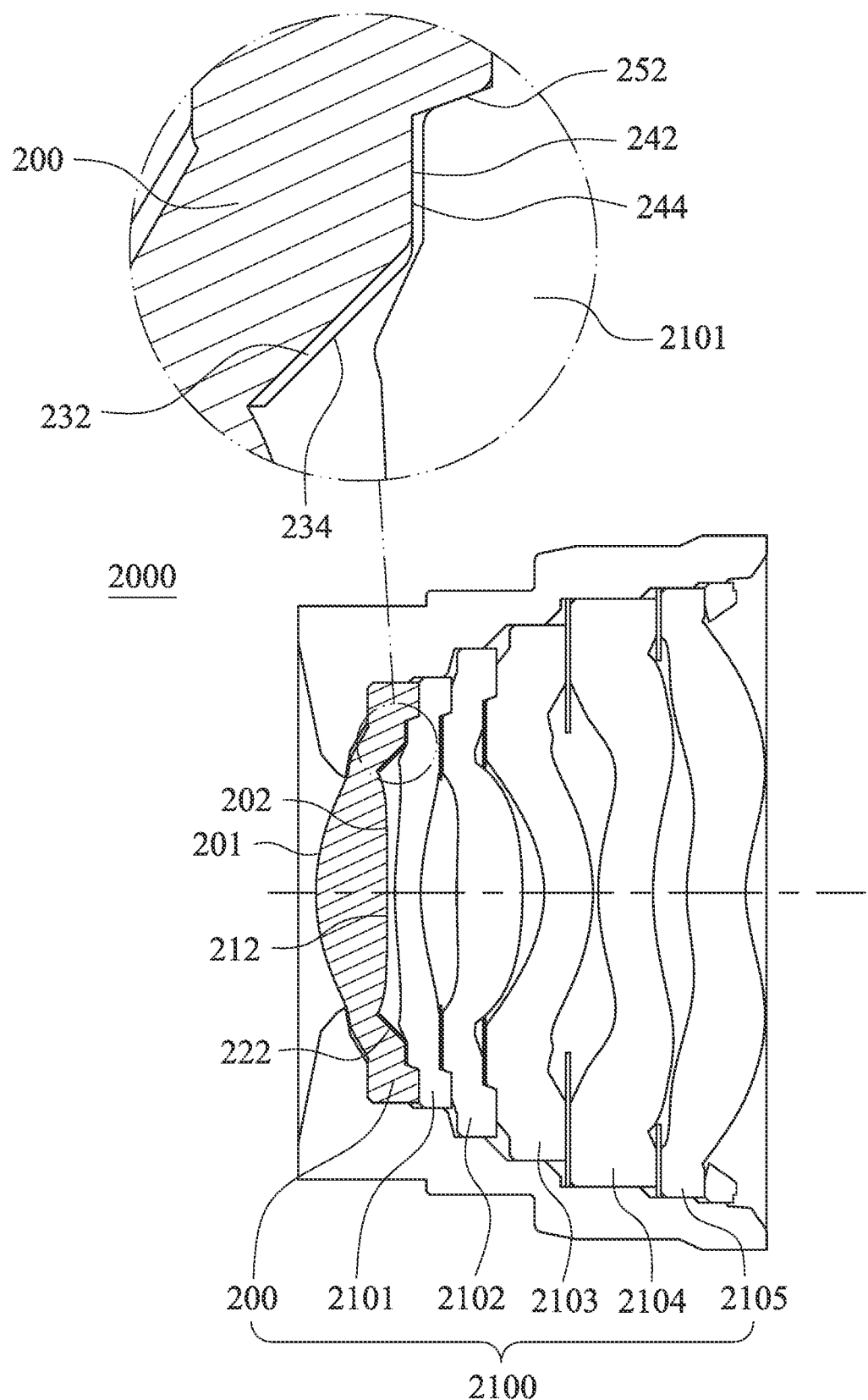
FIG. 2A is a schematic view of a photographing module according to the 2nd embodiment of the present disclosure.

FIG. 2A is a schematic view of a photographing module 2000 according to the 2nd embodiment of the present disclosure. In FIG. 2A, the photographing module 2000 includes an imaging lens assembly 2100. The imaging lens assembly 2100 includes a plurality of lens elements, wherein one of the lens elements is a plastic lens element 200, and at least one surface of an object-side surface 201 and an image-side surface 202 of the plastic lens element 200 (the aforementioned surface is the image-side surface 202 in the 2nd embodiment) includes an effective optical portion 212 and a peripheral portion 222.

The effective optical portion 212 of the plastic lens element 200 is aspheric. The peripheral portion 222 surrounds the effective optical portion 212, and includes a plurality of rib structures 232, a first fitting section 252 and an isolation section 242.

Figure 2B:
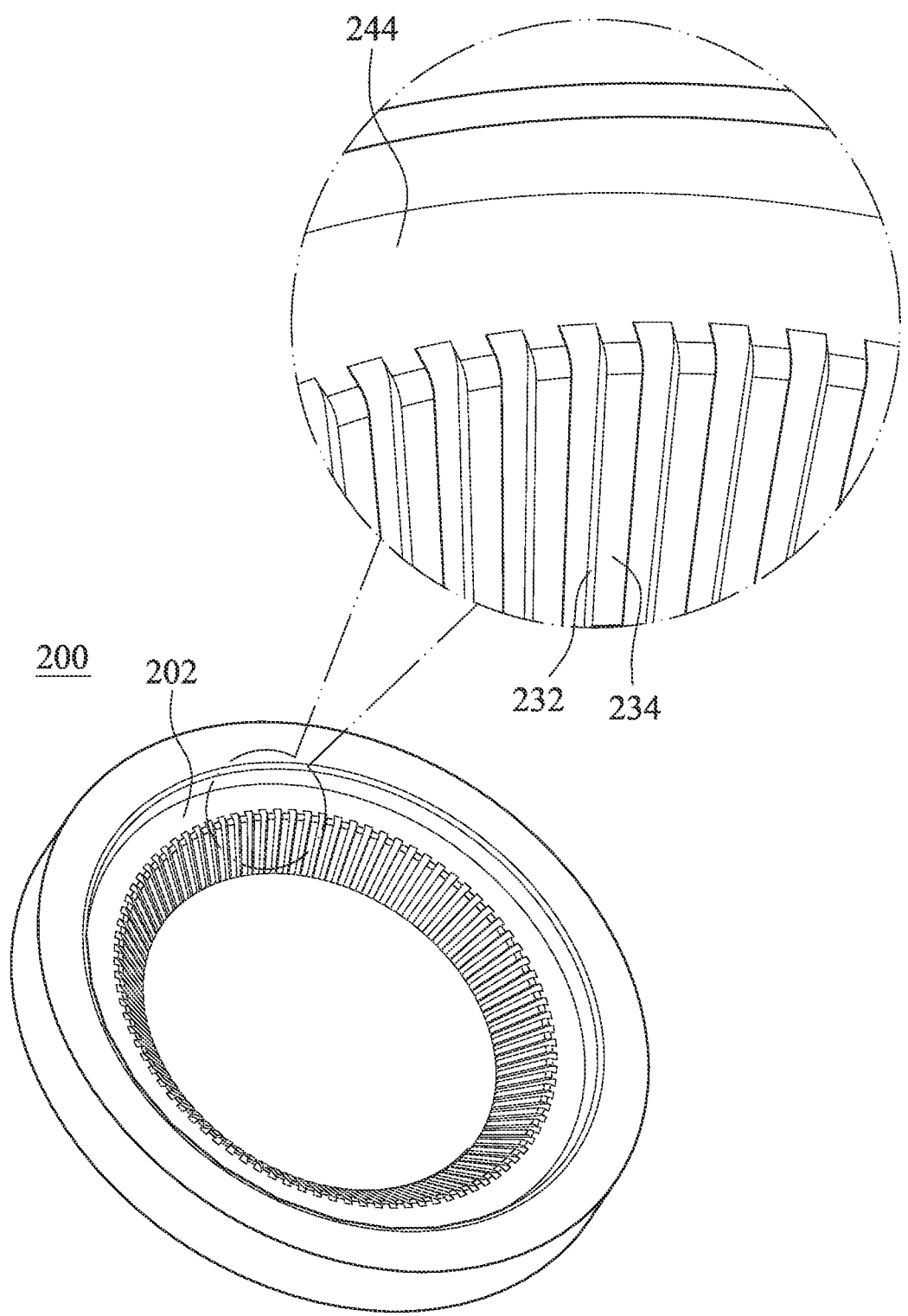
FIG. 2B is a schematic view of the plastic lens element according to the 2nd embodiment.

FIG. 2B is a schematic view of the plastic lens element 200 according to the 2nd embodiment. In FIG. 2A and FIG. 2B, each of the rib structures 232 has a strip shape along a radial direction of an optical axis of the imaging lens assembly 2100, wherein the cross-section in the radial direction of the optical axis of each of the rib structures 232 is a rectangle, and the rib structures 232 are arranged around the effective optical portion 212.

In FIG. 2A, the first fitting section 252 surrounds the effective optical portion 212, and is connected to a lens element 2101 adjacent to the image-side surface 202 for aligning the plastic lens element 200 with the lens element 2101. That is, the plastic lens element 200 and the lens element 2101 can be aligned with the optical axis of the imaging lens assembly 2100.

The isolation section 242 is disposed between the rib structures 232 and the first fitting section 252. There is an air gap between the isolation section 242 and the lens element 2101.

In the 2nd embodiment, the imaging lens assembly 2100 includes, in order from an object side to an image side, the plastic lens element 200, lens elements 2101, 2102, 2103, 2104 and 2105, wherein the imaging lens assembly 2100 has a total of six lens elements, and the plastic lens element 200 is the first lens element of the imaging lens assembly 2100 in order from the object side to the image side.

In FIG. 2A and FIG. 2B, the rib structures 232 is closer to the effective optical portion 212 than the first fitting section 252. A number of the rib structures 232 is 90.

Each of the rib structures 232 includes a light diminishing surface 234. The light diminishing surfaces 234 are rough surfaces and transferred from the sand blasting machining properties of the mold surfaces during the injection molding process. Each of the light diminishing surfaces 234 is located on all area of every surfaces of each of the rib structures 232.

The isolation section 242 is a smooth surface, wherein the smoothness of the isolation section 242 is the same as or similar to the smoothness of the effective optical portion 212. Furthermore, the isolation section 242 includes an annular surface 244, wherein a normal direction of the annular surface 244 is parallel to the optical axis of the imaging lens assembly 2100.

Figure 2C:
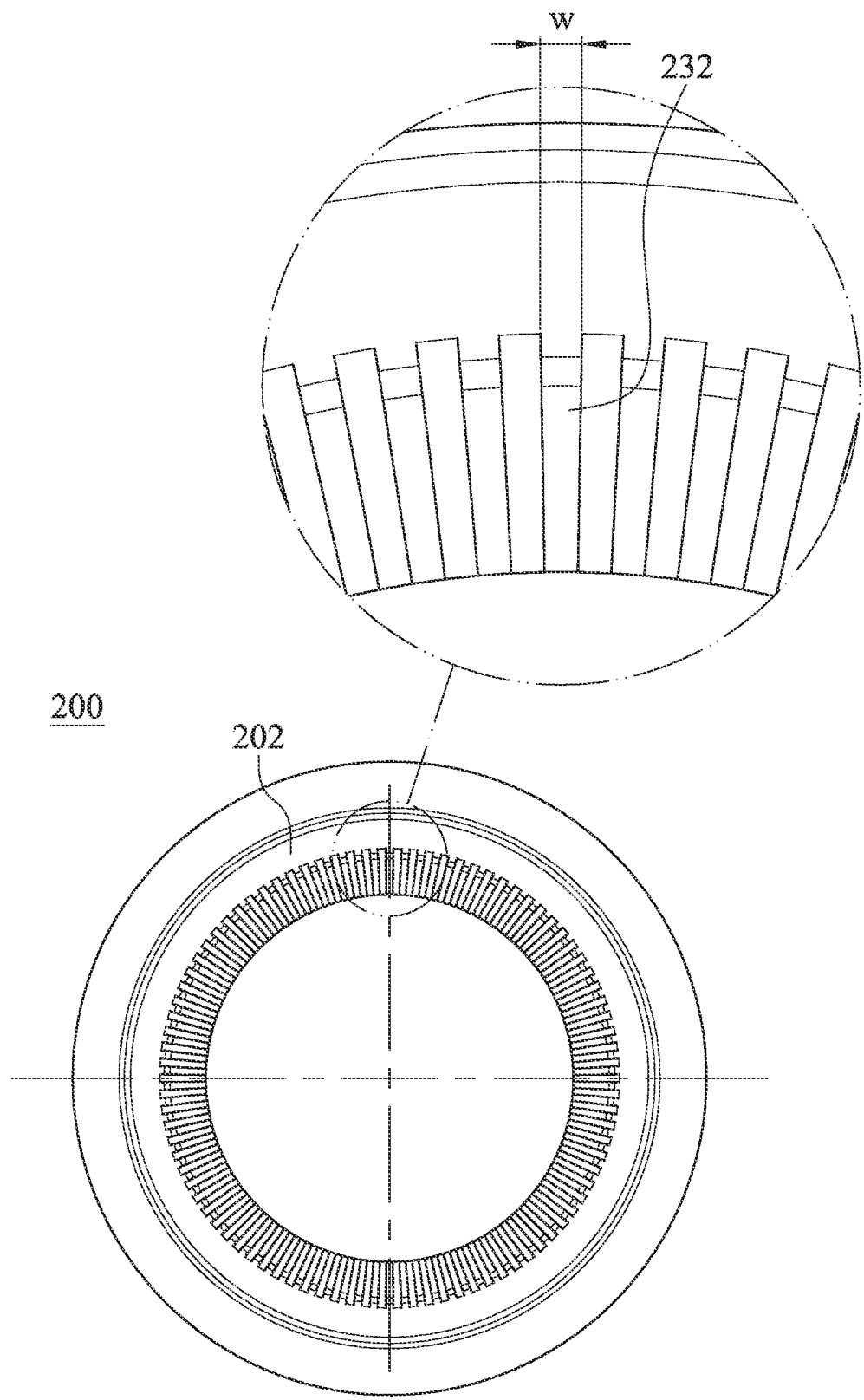
FIG. 2C is a schematic view of the parameter w of the plastic lens element according to the 2nd embodiment.
Figure 2D:
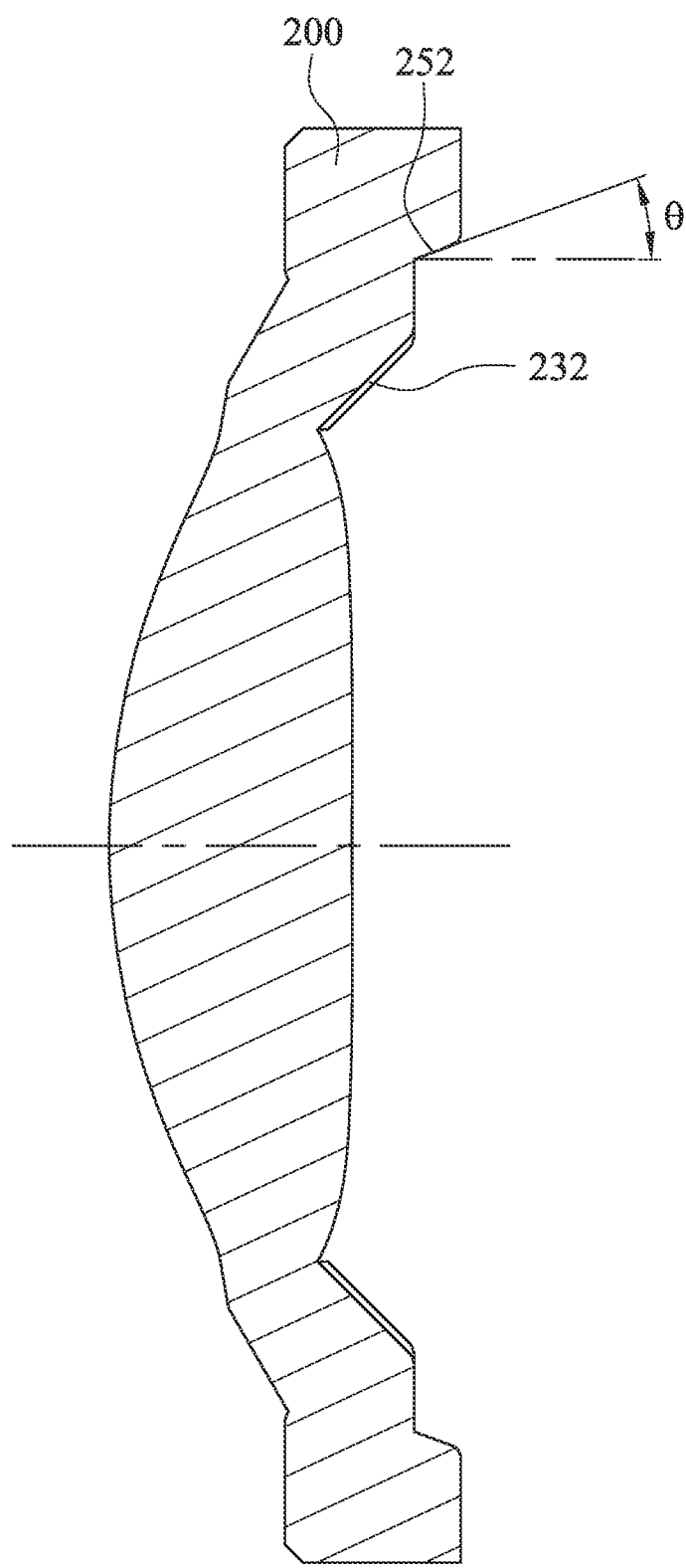
FIG. 2D is a schematic view of the parameter θ of the plastic lens element according to the 2nd embodiment.

FIG. 2C is a schematic view of the parameter w of the plastic lens element 200 according to the 2nd embodiment, and FIG. 2D is a schematic view of the parameter θ of the plastic lens element 200 according to the 2nd embodiment. The data of the parameters N, Ra, V, w and θ of the photographing module 2000 according to the 2nd embodiment of the present disclosure are listed in the following Table 2, wherein the parameters are also shown as FIG. 2C and FIG. 2D. The definitions of these parameters shown in Table 2 are the same as those stated in the 1st embodiment with corresponding values for the 2nd embodiment.

TABLE 2

| 2nd Embodiment | | | |
|---|---|---|---|
| N | 6 | w (mm) | 0.05 |
| Ra (μm) | 0.56~0.8 | θ (deg.) | 20 |
| V | 21.4 | | |

3rd Embodiment

Figure 3A:
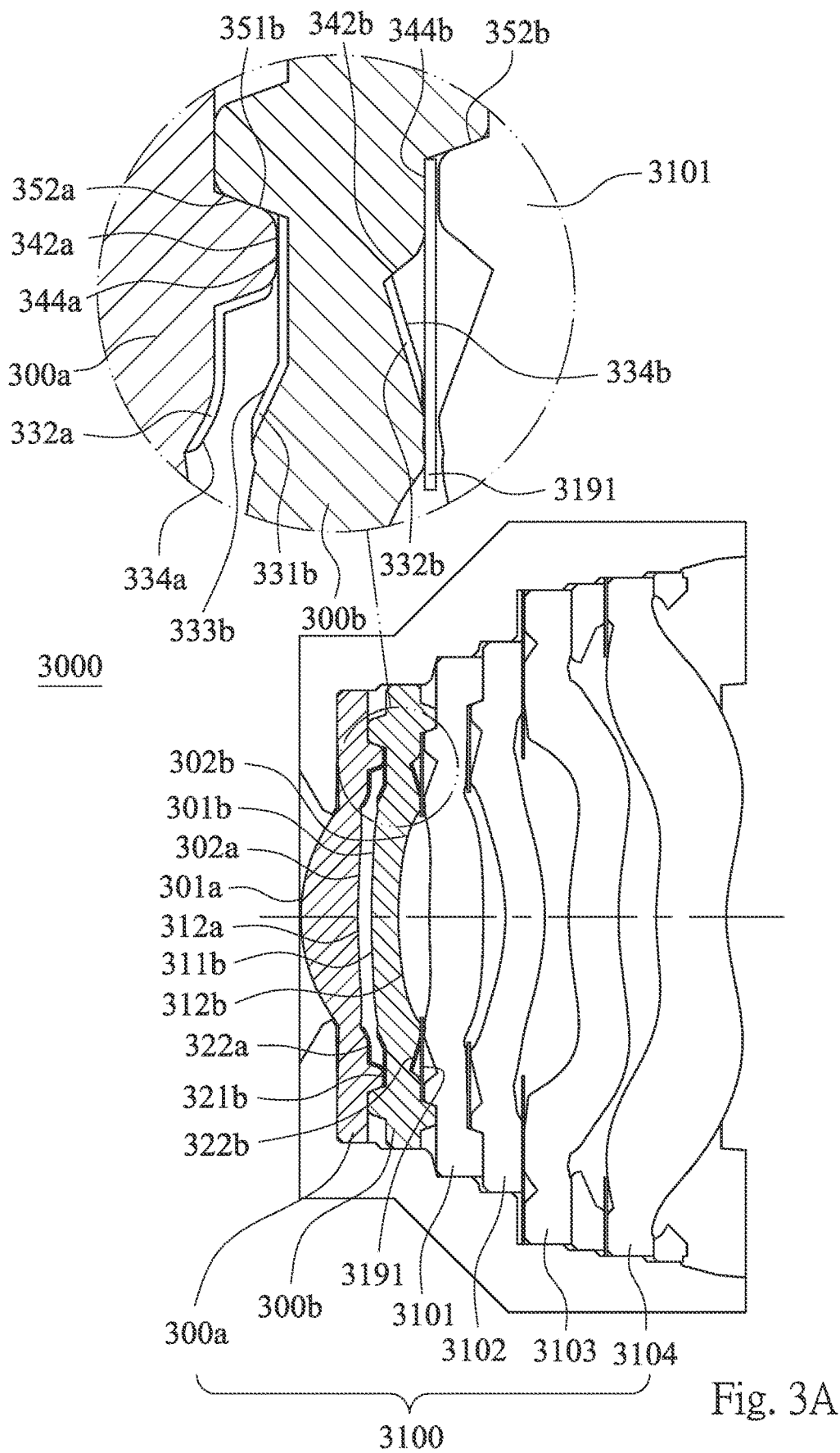
FIG. 3A is a schematic view of a photographing module according to the 3rd embodiment of the present disclosure.

FIG. 3A is a schematic view of a photographing module 3000 according to the 3rd embodiment of the present disclosure. In FIG. 3A, the photographing module 3000 includes an imaging lens assembly 3100. The imaging lens assembly 3100 includes a plurality of lens elements, wherein two of the lens elements are plastic lens elements 300a and 300b.

First, the plastic lens element 300a would be described. At least one surface of an object-side surface 301a and an image-side surface 302a of the plastic lens element 300a (the aforementioned surface is the image-side surface 302a of the plastic lens element 300a in the 3rd embodiment) includes an effective optical portion 312a and a peripheral portion 322a.

The effective optical portion 312a of the plastic lens element 300a is aspheric. The peripheral portion 322a surrounds the effective optical portion 312a, and includes a plurality of rib structures 332a, a first fitting section 352a and an isolation section 342a.

Figure 3B:
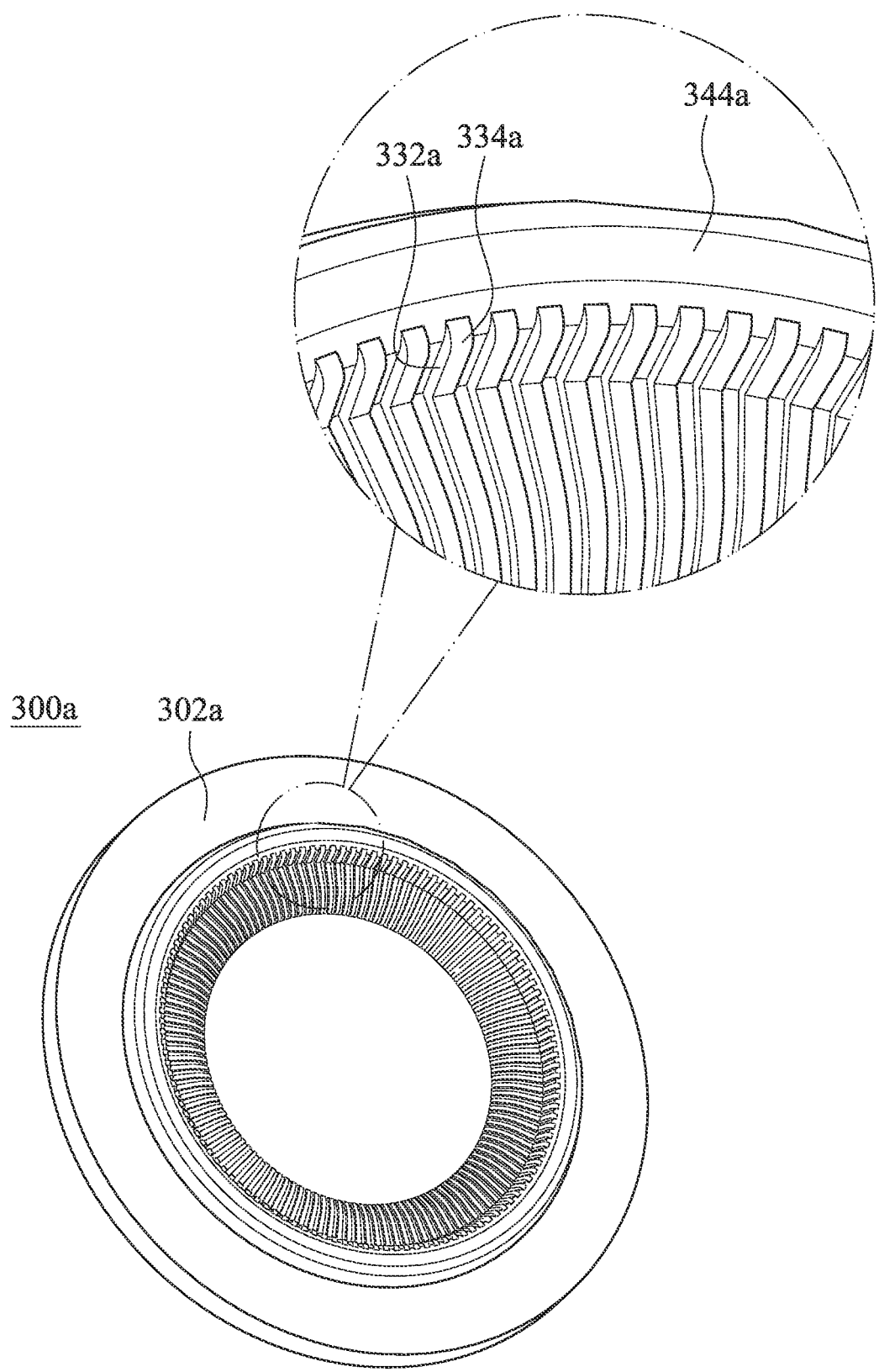
FIG. 3B is a schematic view of the plastic lens element according to the 3rd embodiment.

FIG. 3B is a schematic view of the plastic lens element 300a according to the 3rd embodiment. In FIG. 3A and FIG. 3B, each of the rib structures 332a has a strip shape along a radial direction of an optical axis of the imaging lens assembly 3100, wherein the cross-section in the radial direction of the optical axis of each of the rib structures 332a is a rectangle, and the rib structures 332a are arranged around the effective optical portion 312a.

In FIG. 3A, the first fitting section 352a surrounds the effective optical portion 312a, and is connected to the plastic lens element 300b adjacent to the image-side surface 302a for aligning the plastic lens element 300a with the plastic lens element 300b. That is, the plastic lens element 300a and the plastic lens element 300b can be aligned with the optical axis of the imaging lens assembly 3100.

The isolation section 342a is disposed between the rib structures 332a and the first fitting section 352a. There is an air gap between the isolation section 342a and the plastic lens element 300b. Furthermore, when the image-side surface 302a and an object-side surface 301b of the plastic lens element 300b, which is adjacent to the image-side surface 302a, include rib structures 332a and 331b respectively, the isolation section 342a can prevent the lens elements 300a and 300b from collisions and interference after assembling.

In the 3rd embodiment, the imaging lens assembly 3100 includes, in order from an object side to an image side, the plastic lens elements 300a, 300b, lens elements 3101, 3102, 3103 and 3104, wherein the imaging lens assembly 3100 has a total of six lens elements, and the plastic lens element 300a is the first lens element of the imaging lens assembly 3100 in order from the object side to the image side.

In FIG. 3A and FIG. 3B, the rib structures 332a is closer to the effective optical portion 312a than the first fitting section 352a. A number of the rib structures 332a is 120, wherein each of the rib structures 332a is V-shaped.

Each of the rib structures 332a includes a light diminishing surface 334a. The light diminishing surfaces 334a are rough surfaces and transferred from the laser related etching machining properties of the mold surfaces during the injection molding process. Each of the light diminishing surfaces 334a is located on all area of every surfaces of each of the rib structures 332a.

The isolation section 342a is a smooth surface, wherein the smoothness of the isolation section 342a is the same as or similar to the smoothness of the effective optical portion 312a. Furthermore, the isolation section 342a includes an annular surface 344a, wherein a normal direction of the annular surface 344a is parallel to the optical axis of the imaging lens assembly 3100.

Figure 3C:
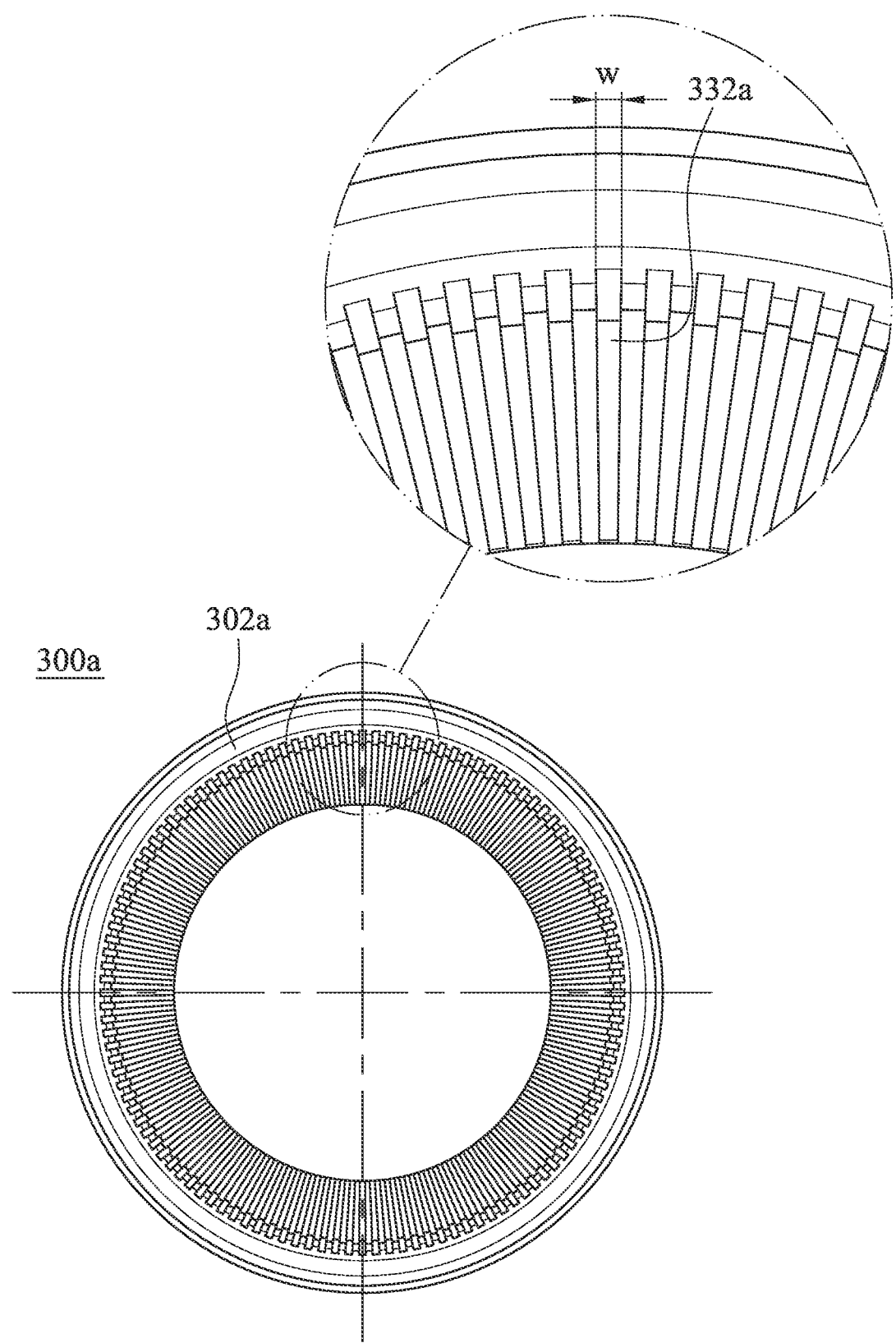
FIG. 3C is a schematic view of the parameter w of the plastic lens element according to the 3rd embodiment.
Figure 3D:
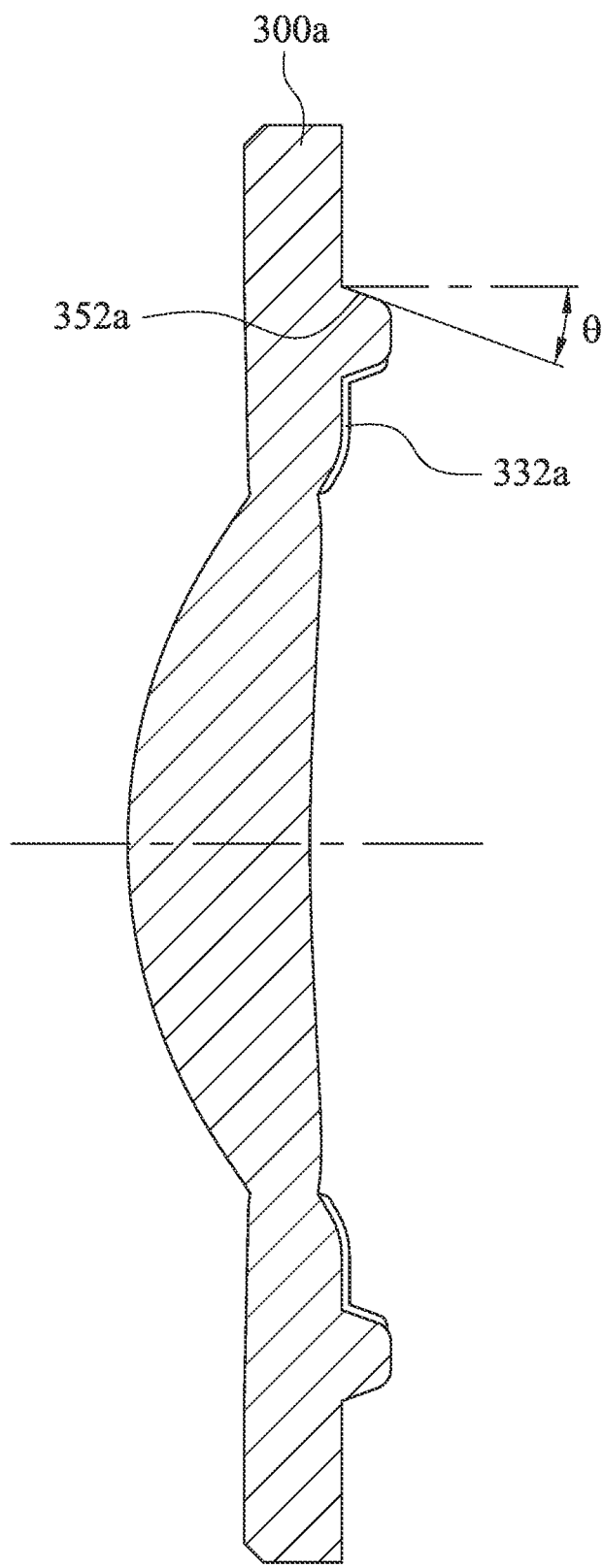
FIG. 3D is a schematic view of the parameter θ of the plastic lens element according to the 3rd embodiment.

FIG. 3C is a schematic view of the parameter w of the plastic lens element 300a according to the 3rd embodiment, and FIG. 3D is a schematic view of the parameter θ of the plastic lens element 300a according to the 3rd embodiment. The data of the parameters N, Ra, V, w and θ of the photographing module 3000 and the plastic lens element 300a according to the 3rd embodiment of the present disclosure are listed in the following Table 3.1, wherein the parameters are also shown as FIG. 3C and FIG. 3D. The definitions of these parameters shown in Table 3.1 are the same as those stated in the 1st embodiment with corresponding values for the 3rd embodiment.

TABLE 3.1

| Plastic Lens Element 300a of 3rd Embodiment | | | |
|---|---|---|---|
| N | 6 | w (mm) | 0.033 |
| Ra (μm) | 1.6~3.15 | θ (deg.) | 20 |
| V | 20.4 | | |

Next, the plastic lens element 300b would be described. In FIG. 3A, at least one surface of an object-side surface 301b and an image-side surface 302b of the plastic lens element 300b (the aforementioned surface is the image-side surface 302b of the plastic lens element 300b in the 3rd embodiment) includes an effective optical portion 312b and a peripheral portion 322b.

The effective optical portion 312b of the plastic lens element 300b is aspheric. The peripheral portion 322b surrounds the effective optical portion 312b, and includes a plurality of rib structures 332b, a first fitting section 352b and an isolation section 342b.

Figure 3E:
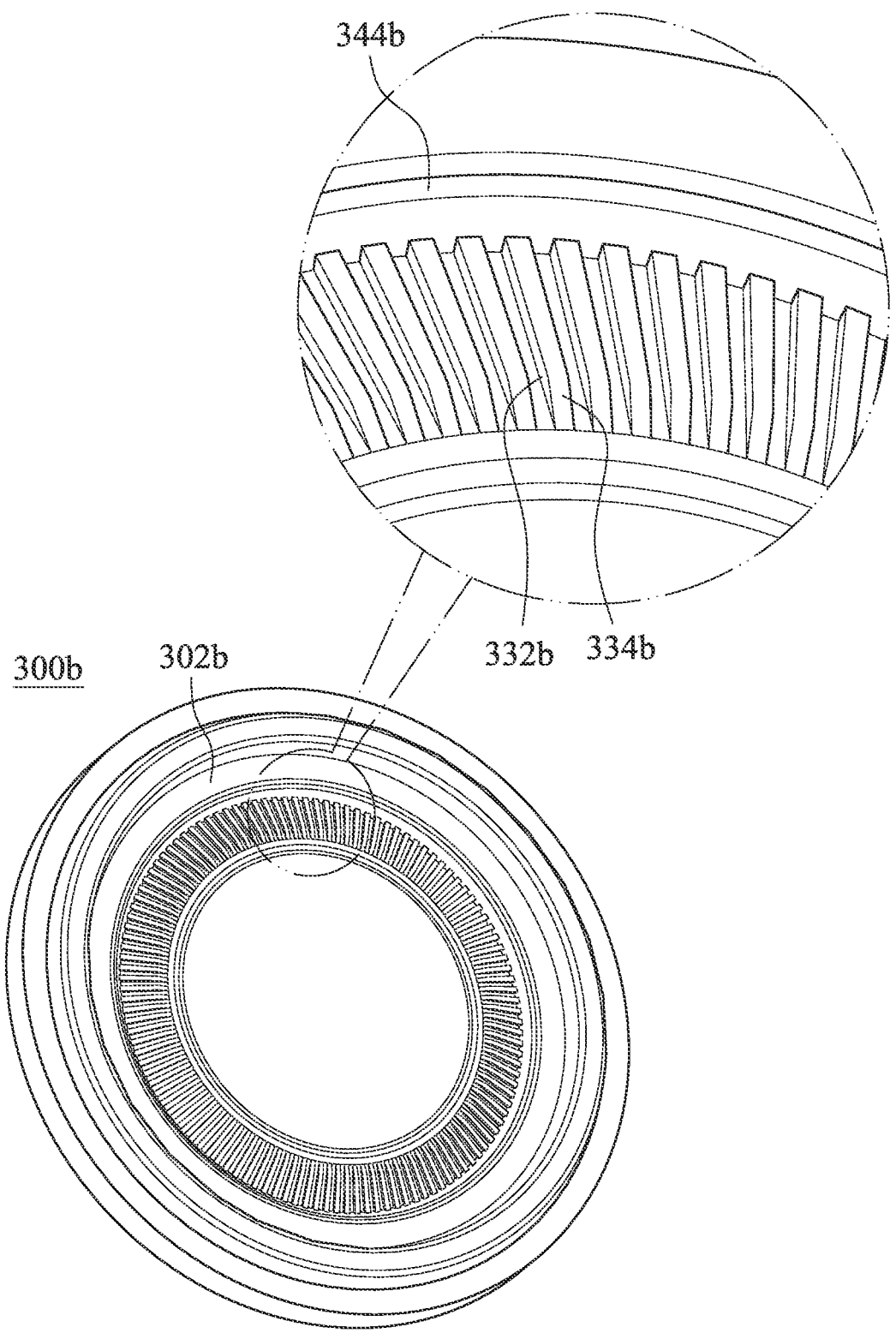
FIG. 3E is a schematic view of another plastic lens element according to the 3rd embodiment.

FIG. 3E is a schematic view of the plastic lens element 300b according to the 3rd embodiment. In FIG. 3A and FIG. 3E, each of the rib structures 332b has a strip shape along a radial direction of the optical axis of the imaging lens assembly 3100, wherein the cross-section in the radial direction of the optical axis of each of the rib structures 332b is a rectangle, and the rib structures 332b are arranged around the effective optical portion 312b.

In FIG. 3A, the first fitting section 352b surrounds the effective optical portion 312b, and is connected to the lens element 3101 adjacent to the image-side surface 302b for aligning the plastic lens element 300b with the lens element 3101. That is, the plastic lens element 300b and the lens element 3101 can be aligned with the optical axis of the imaging lens assembly 3100.

The isolation section 342b is disposed between the rib structures 332b and the first fitting section 352b. There is an air gap between the isolation section 342b and the lens element 3101, and there is another air gap between the isolation section 342b and a light blocking sheet 3191.

In the 3rd embodiment, the imaging lens assembly 3100 includes, in order from an object side to an image side, the plastic lens elements 300a, 300b, lens elements 3101, 3102, 3103 and 3104, wherein the imaging lens assembly 3100 has a total of six lens elements, and the plastic lens element 300b is the second lens element of the imaging lens assembly 3100 in order from the object side to the image side. Furthermore, the imaging lens assembly 3100 of the photographing module 3000 can further include the light blocking sheet 3191 disposed between the plastic lens element 300b and the lens element 3101, which is adjacent to the plastic lens element 300b.

In FIG. 3A, the other surface of the object-side surface 301b and the image-side surface 302b of the plastic lens element 300b (the aforementioned other surface is the object-side surface 301b of the plastic lens element 300b in the 3rd embodiment) includes a second fitting section 351b connected to the plastic lens element 300a, which is adjacent to the object-side surface 301b, for aligning the plastic lens element 300b with the plastic lens element 300a. That is, the plastic lens elements 300b and 300a can be aligned with the optical axis of the imaging lens assembly 3100. In the 3rd embodiment, the first fitting section 352b and the second fitting section 351b are connected to the lens element 3101 and the plastic lens element 300a respectively for the plastic lens elements 300a, 300b and the lens element 3101 aligned with the optical axis of the imaging lens assembly 3100.

In FIG. 3A and FIG. 3E, the rib structures 332b is closer to the effective optical portion 312b than the first fitting section 352b. A number of the rib structures 332b is 120.

Each of the rib structures 332b includes a light diminishing surface 334b. The light diminishing surfaces 334b are rough surfaces and transferred from the laser related etching machining properties of the mold surfaces during the injection molding process. Each of the light diminishing surfaces 334b is located on all area of every surfaces of each of the rib structures 332b.

The isolation section 342b is a smooth surface, wherein the smoothness of the isolation section 342b is the same as or similar to the smoothness of the effective optical portion 312b. Furthermore, the isolation section 342b includes an annular surface 344b, wherein a normal direction of the annular surface 344b is parallel to the optical axis of the imaging lens assembly 3100.

Figure 3F:
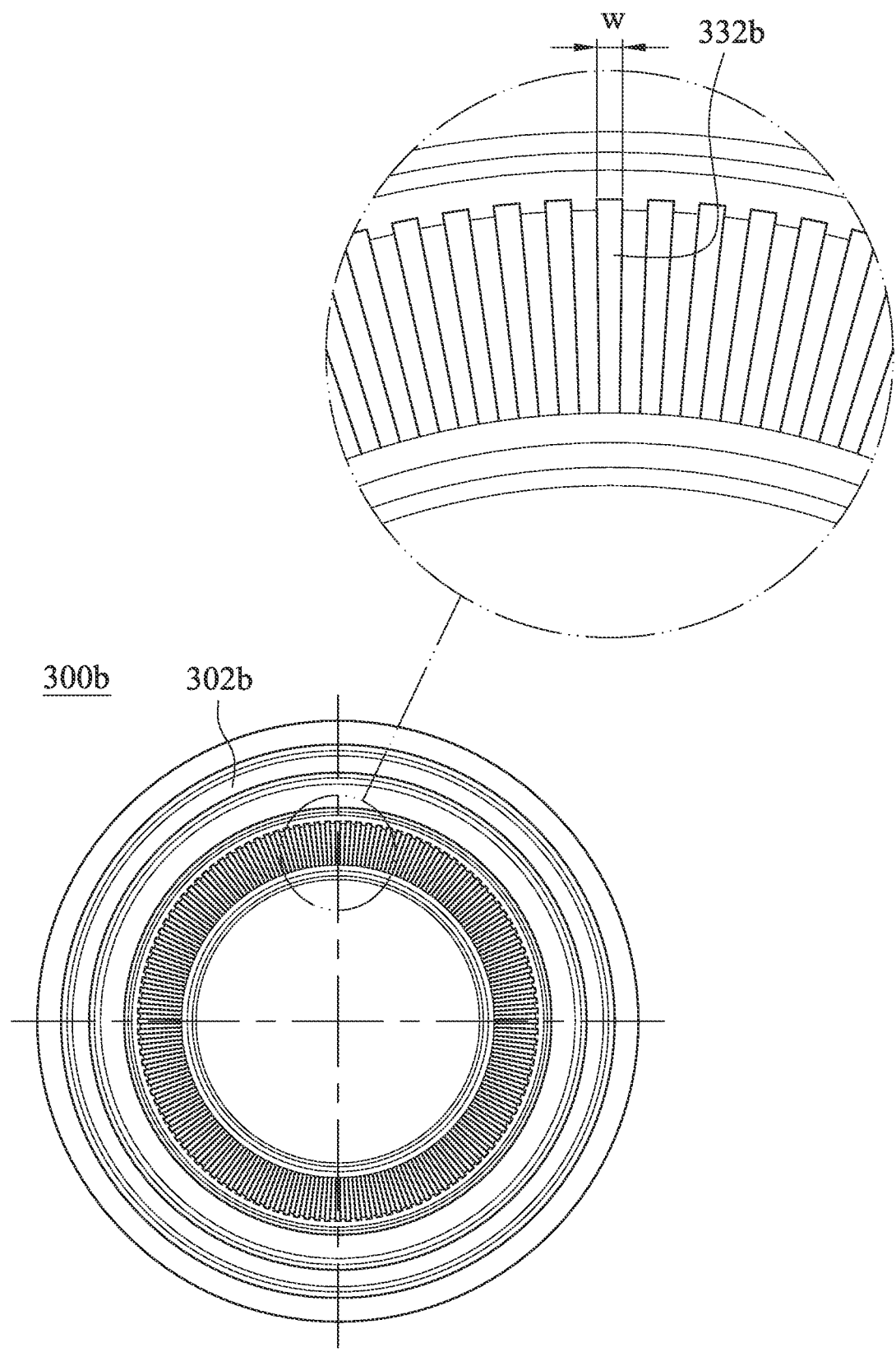
FIG. 3F is a schematic view of the parameter w of the another plastic lens element according to the 3rd embodiment.
Figure 3G:
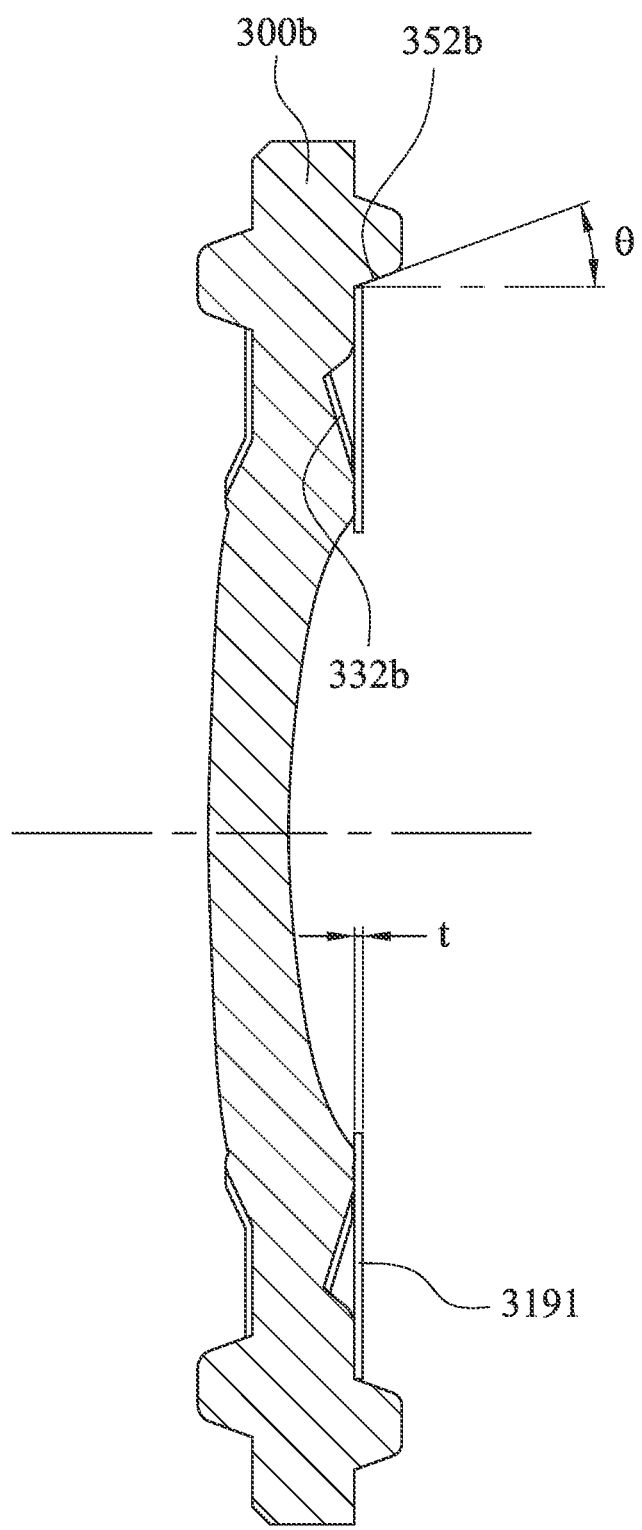
FIG. 3G is a schematic view of the parameters t and θ of the another plastic lens element according to the 3rd embodiment.

FIG. 3F is a schematic view of the parameter w of the plastic lens element 300b according to the 3rd embodiment, and FIG. 3G is a schematic view of the parameters t and θ of the plastic lens element 300b according to the 3rd embodiment. The data of the parameters N, Ra, t, V, w and θ of the photographing module 3000 and the plastic lens element 300b according to the 3rd embodiment of the present disclosure are listed in the following Table 3.2, wherein the parameters are also shown as FIG. 3F and FIG. 3G. The definitions of these parameters shown in Table 3.2 are the same as those stated in the 1st embodiment with corresponding values for the 3rd embodiment.

TABLE 3.2

| Plastic Lens Element 300b of 3rd Embodiment | | | |
|---|---|---|---|
| N | 6 | V | 20.4 |
| Ra (μm) | 1.6~3.15 | w (mm) | 0.033 |
| t (mm) | 0.023 | θ (deg.) | 20 |

In addition, the object-side surface 301b of the plastic lens element 300b includes an effective optical portion 311b and a peripheral portion 321b. The effective optical portion 311b is aspheric. The peripheral portion 321b surrounds the effective optical portion 311b and includes a plurality of rib structures 331b.

Figure 3H:
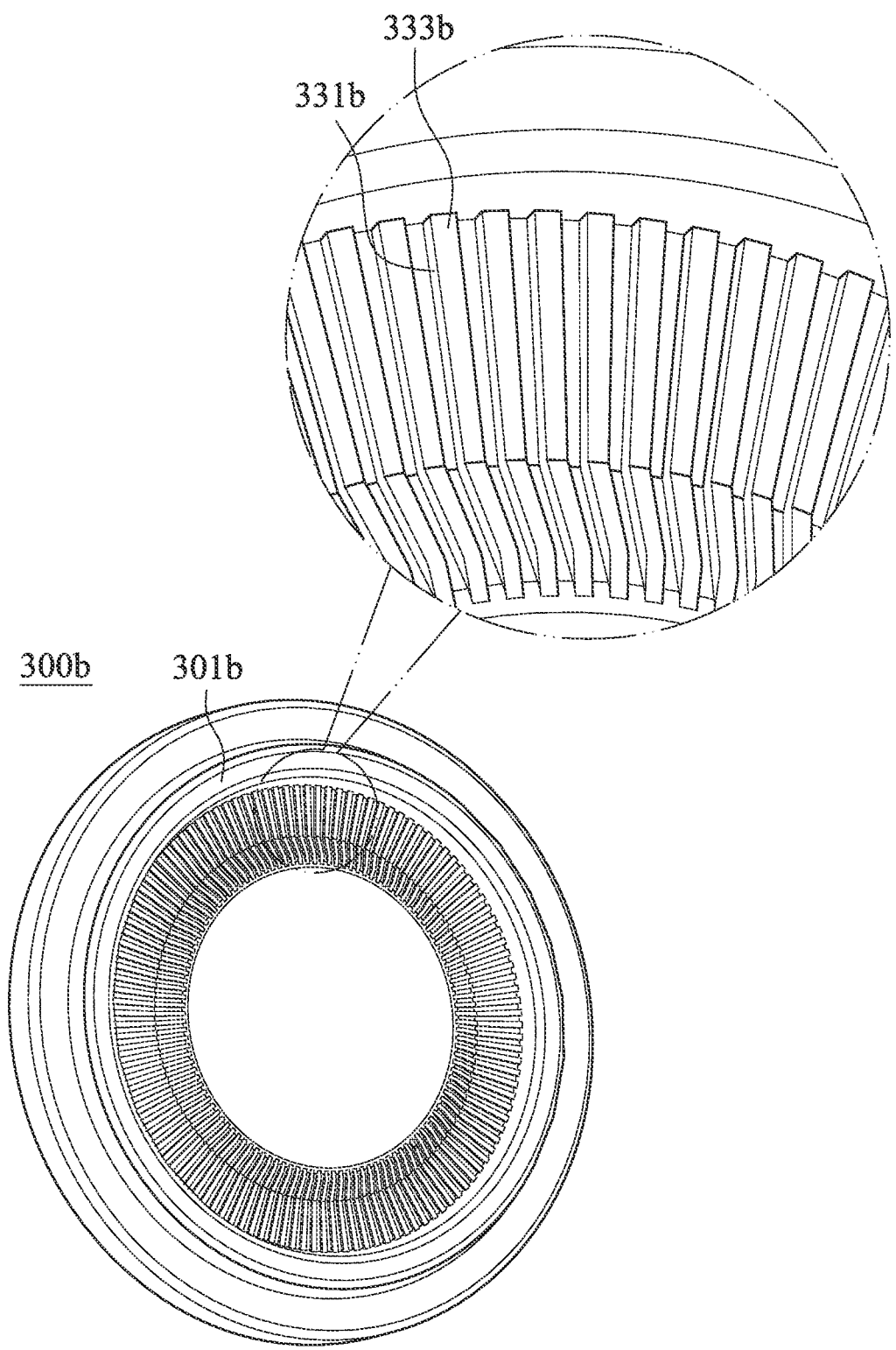
FIG. 3H is a schematic view of the other surface of the another plastic lens element according to the 3rd embodiment.

FIG. 3H is a schematic view of the object-side surface 301b of the plastic lens element 300b according to the 3rd embodiment. In FIG. 3A and FIG. 3H, each of the rib structures 331b has a strip shape along a radial direction of the optical axis of the imaging lens assembly 3100 and is V-shaped, wherein the cross-section in the radial direction of the optical axis of each of the rib structures 331b is a rectangle, the rib structures 331b are arranged around the effective optical portion 311b, and a number of the rib structures 331b is 120.

Each of the rib structures 331b includes a light diminishing surface 333b. The light diminishing surfaces 333b are rough surfaces and transferred from the laser related etching machining properties of the mold surfaces during the injection molding process. Each of the light diminishing surfaces 333b is located on all area of every surfaces of each of the rib structures 331b.

In FIG. 3A, there is an air gap between the isolation section 342a of the plastic lens element 300a and the plastic lens element 300b, which is adjacent to the plastic lens element 300a. When the image-side surface 302a of the plastic lens element 300a and the object-side surface 301b of the plastic lens element 300b include the rib structures 332a and 331b respectively, the isolation section 342a can prevent the lens elements 300a and 300b from collisions and interference after assembling.

Figure 3I:
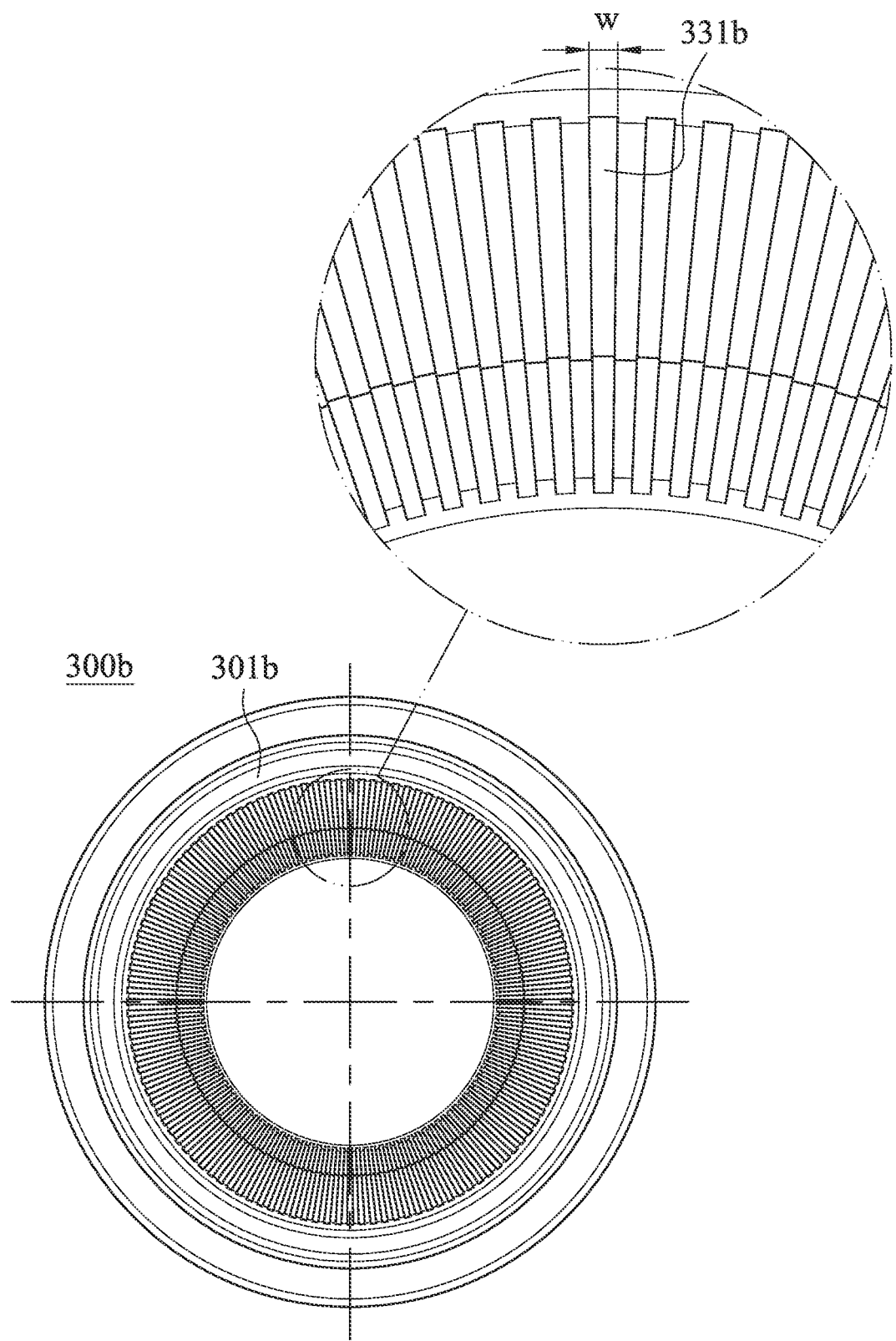
FIG. 3I is a schematic view of the parameter w of the other surface of the another plastic lens element according to the 3rd embodiment.

FIG. 3I is a schematic view of the parameter w of the object-side surface 301b of the plastic lens element 300b according to the 3rd embodiment. When a greatest width of each of the rib structures 331b is w, the following condition is satisfied: w=0.036 mm.

4th Embodiment

Figure 4A:
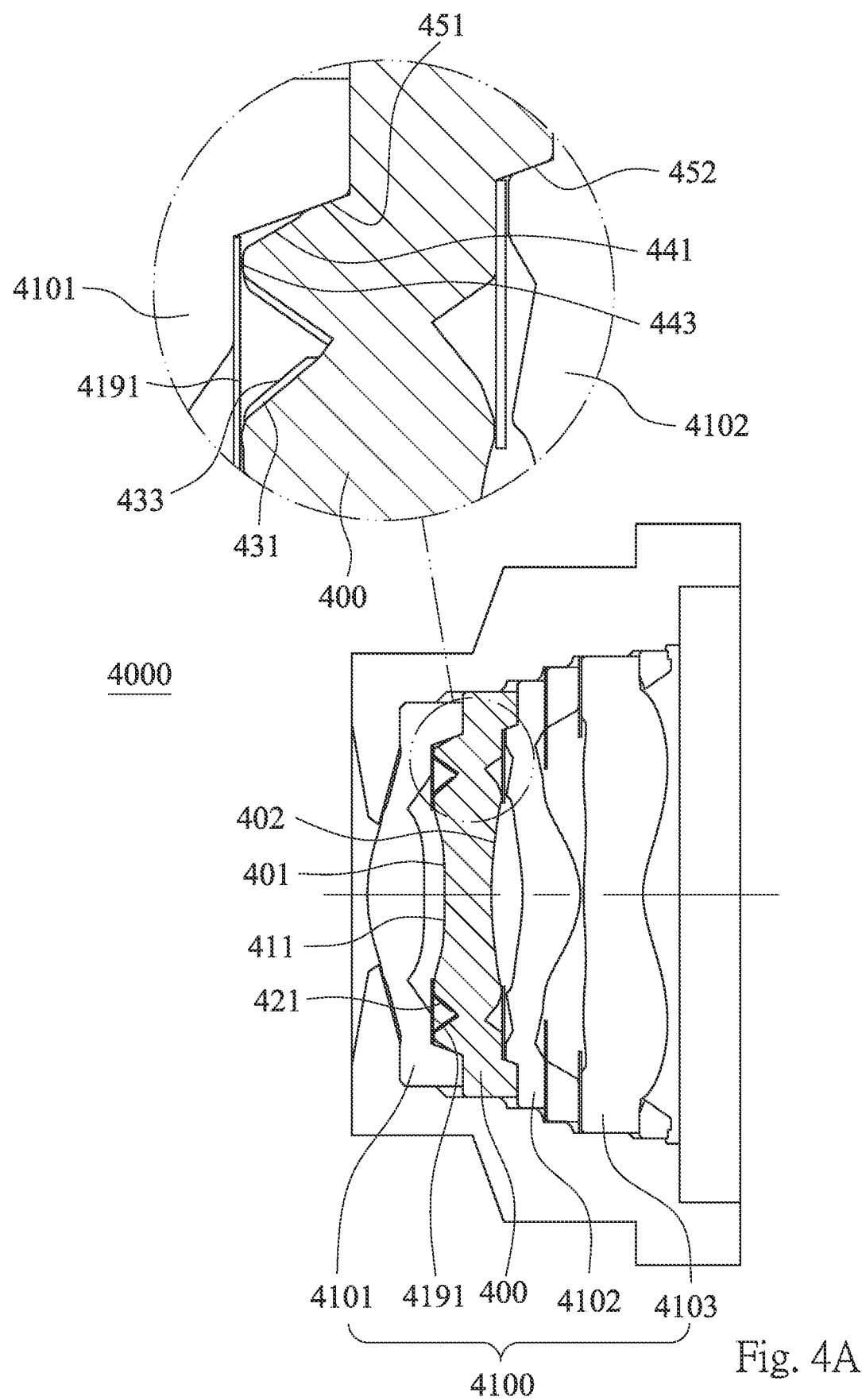
FIG. 4A is a schematic view of a photographing module according to the 4th embodiment of the present disclosure.

FIG. 4A is a schematic view of a photographing module 4000 according to the 4th embodiment of the present disclosure. In FIG. 4A, the photographing module 4000 includes an imaging lens assembly 4100. The imaging lens assembly 4100 includes a plurality of lens elements, wherein one of the lens elements is a plastic lens element 400, and at least one surface of an object-side surface 401 and an image-side surface 402 of the plastic lens element 400 (the aforementioned surface is the object-side surface 401 in the 4th embodiment) includes an effective optical portion 411 and a peripheral portion 421.

The effective optical portion 411 of the plastic lens element 400 is aspheric. The peripheral portion 421 surrounds the effective optical portion 411, and includes a plurality of rib structures 431, a first fitting section 451 and an isolation section 441.

Figure 4B:
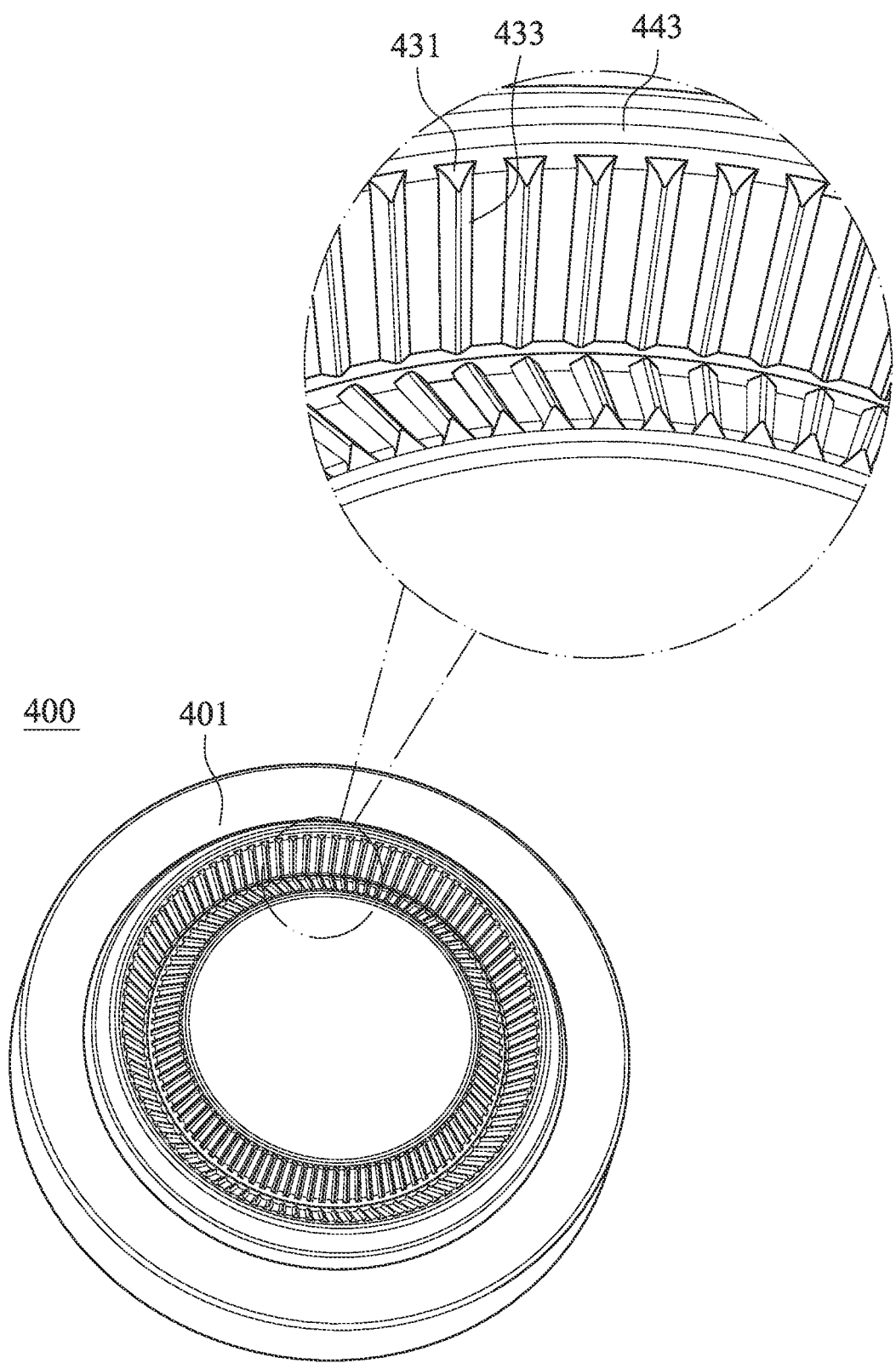
FIG. 4B is a schematic view of the plastic lens element according to the 4th embodiment.

FIG. 4B is a schematic view of the plastic lens element 400 according to the 4th embodiment. In FIG. 4A and FIG. 4B, each of the rib structures 431 has a strip shape along a radial direction of an optical axis of the imaging lens assembly 4100, wherein the cross-section in the radial direction of the optical axis of each of the rib structures 431 is a triangle, and the rib structures 431 are arranged around the effective optical portion 411.

In FIG. 4A, the first fitting section 451 surrounds the effective optical portion 411, and is connected to a lens element 4101 adjacent to the object-side surface 401 for aligning the plastic lens element 400 with the lens element 4101. That is, the plastic lens element 400 and the lens element 4101 can be aligned with the optical axis of the imaging lens assembly 4100.

The isolation section 441 is disposed between the rib structures 431 and the first fitting section 451. There is an air gap between the isolation section 441 and the lens element 4101, and there is another air gap between the isolation section 441 and a light blocking sheet 4191.

In the 4th embodiment, the imaging lens assembly 4100 includes, in order from an object side to an image side, the lens elements 4101, the plastic lens element 400, lens elements 4102 and 4103, wherein the imaging lens assembly 4100 has a total of four lens elements, and the plastic lens element 400 is the second lens element of the imaging lens assembly 4100 in order from the object side to the image side. Furthermore, the imaging lens assembly 4100 of the photographing module 4000 further includes the light blocking sheet 4191 disposed between the plastic lens element 400 and the lens element 4101, which is adjacent to the plastic lens element 400.

In FIG. 4A, the other surface of the object-side surface 401 and the image-side surface 402 of the plastic lens element 400 (the aforementioned the other surface is the image-side surface 402 in the 4th embodiment) includes a second fitting section 452 connected to the lens element 4102, which is adjacent to the image-side surface 402, for aligning the plastic lens element 400 with the lens element 4102. That is, the plastic lens element 400 and the lens element 4102 can be aligned with the optical axis of the imaging lens assembly 4100. In the 4th embodiment, the first fitting section 451 and the second fitting section 452 are connected to the lens elements 4101 and 4102 respectively for the lens element 4101, the plastic lens element 400 and the lens element 4102 aligned with the optical axis of the imaging lens assembly 4100.

In FIG. 4A and FIG. 4B, the rib structures 431 is closer to the effective optical portion 411 than the first fitting section 451. A number of the rib structures 431 is 180. The rib structures 431 are divided into two groups, which are arranged in order along the radial direction of the optical axis of the imaging lens assembly 4100. That is, one group being near the optical axis and the other group being far from the optical axis are separated by a bend of the peripheral portion 421. A number of the rib structures 431 of each of the two groups is 90.

Each of the rib structures 431 includes a light diminishing surface 433. The light diminishing surfaces 433 are rough surfaces and transferred from the sand blasting machining properties of the mold surfaces during the injection molding process. Each of the light diminishing surfaces 433 is located on all area of every surfaces of each of the rib structures 431.

The isolation section 441 is a smooth surface, wherein the smoothness of the isolation section 441 is the same as or similar to the smoothness of the effective optical portion 411. Furthermore, the isolation section 441 includes an annular surface 443, wherein a normal direction of the annular surface 443 is parallel to the optical axis of the imaging lens assembly 4100.

Figure 4C:
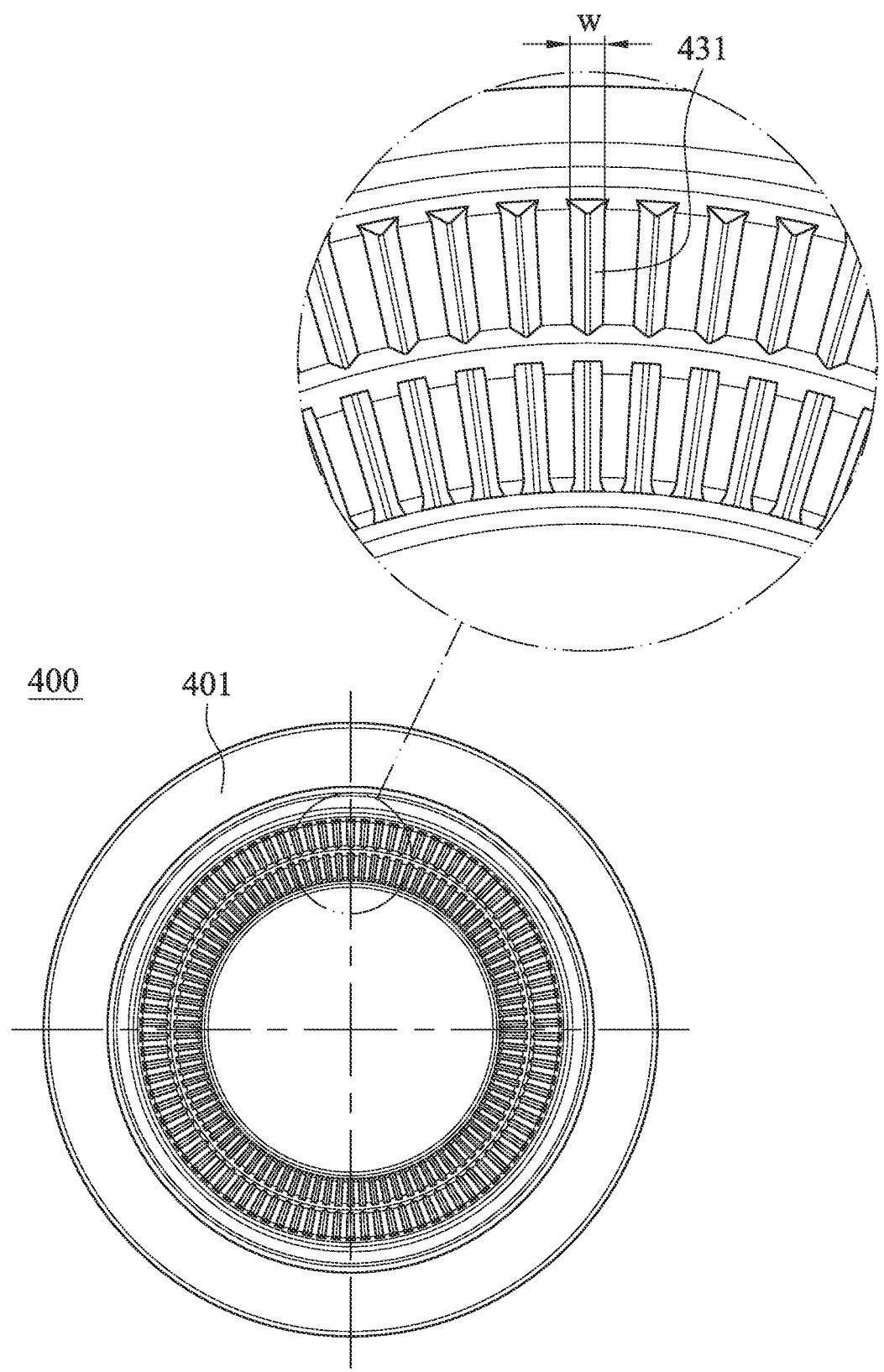
FIG. 4C is a schematic view of the parameter w of the plastic lens element according to the 4th embodiment.
Figure 4D:
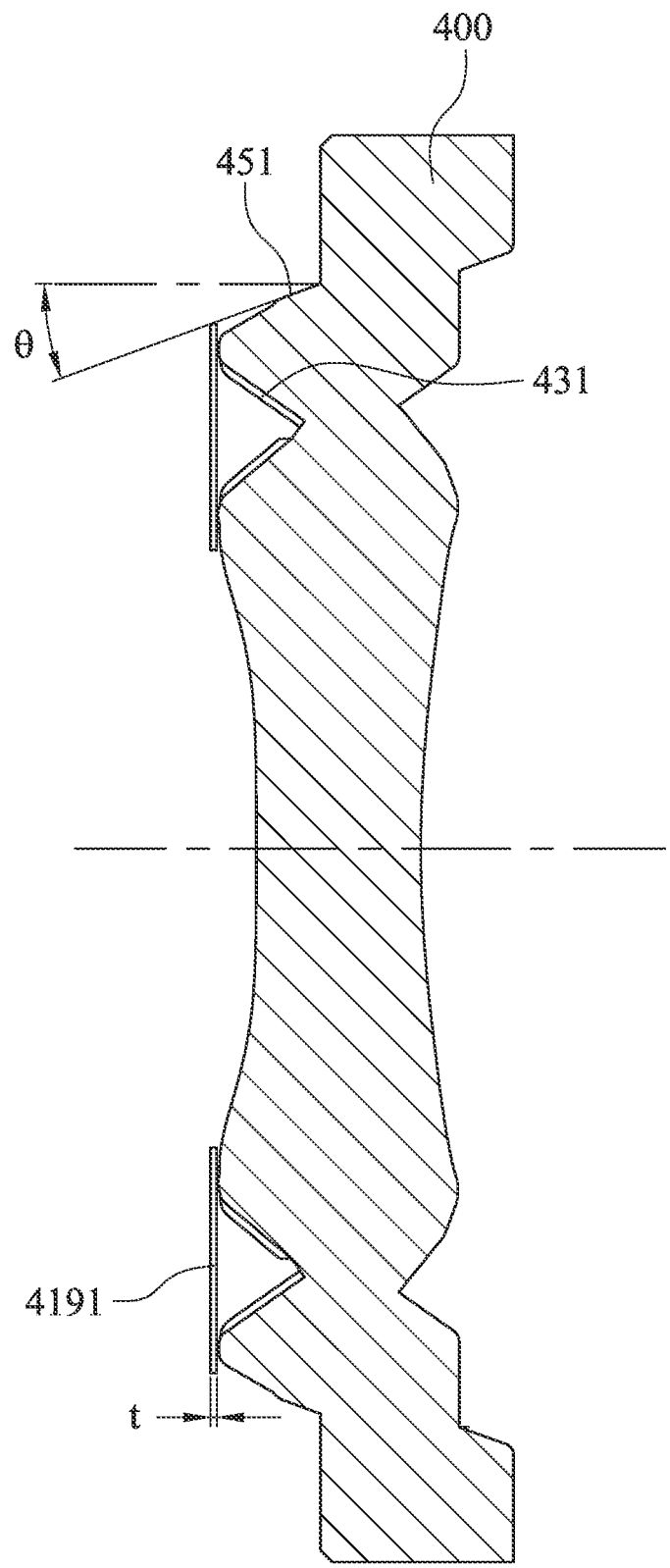
FIG. 4D is a schematic view of the parameters t and θ of the plastic lens element according to the 4th embodiment.

FIG. 4C is a schematic view of the parameter w of the plastic lens element 400 according to the 4th embodiment, and FIG. 4D is a schematic view of the parameters t and θ of the plastic lens element 400 according to the 4th embodiment. The data of the parameters N, Ra, t, V, w and θ of the photographing module 4000 according to the 4th embodiment of the present disclosure are listed in the following Table 4, wherein the parameters are also shown as FIG. 4C and FIG. 4D. The definitions of these parameters shown in Table 4 are the same as those stated in the 1st embodiment with corresponding values for the 4th embodiment.

TABLE 4

| 4th Embodiment | | | |
|---|---|---|---|
| N | 4 | V | 23.3 |
| Ra (μm) | 0.80~2.24 | w (mm) | 0.034 |
| t (mm) | 0.016 | θ (deg.) | 20 |

5th Embodiment

Figure 5:
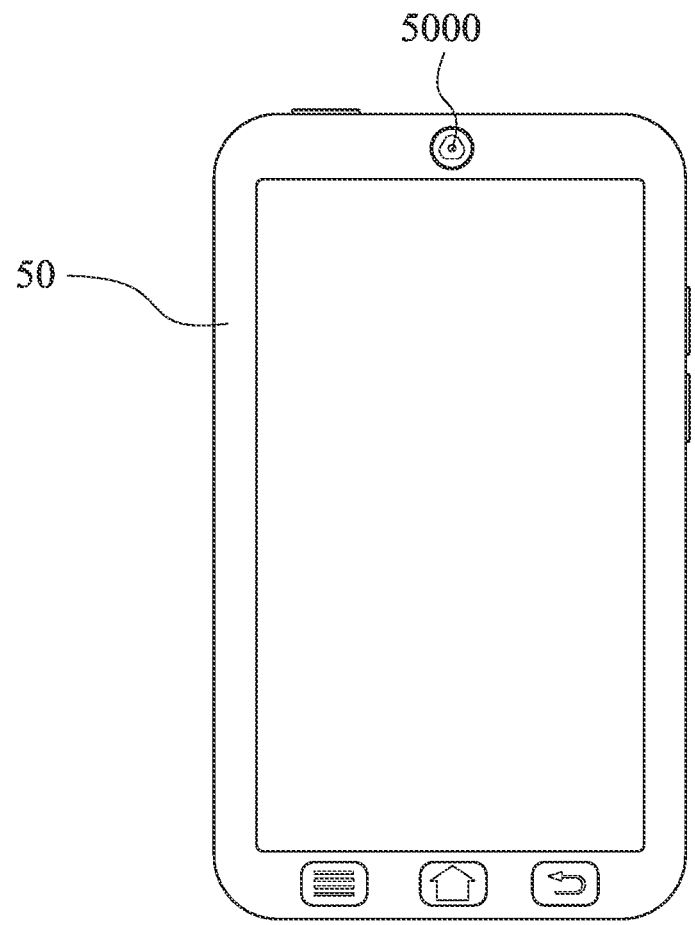
FIG. 5 shows an electronic device according to the 5th embodiment of the present disclosure.

FIG. 5 shows an electronic device 50 according to the 5th embodiment of the present disclosure. The electronic device 50 of the 5th embodiment is a smart phone, wherein the electronic device 50 includes a photographing module 5000 according to the present disclosure. Therefore, it is favorable for simultaneously suppressing the stray light and enhancing alignment precision with the optical axis so as to improve the image quality and satisfy the requirements of high-end electronic devices with camera functionalities. Furthermore, the electronic device 50 can further include an image sensor (not shown herein) disposed on or near an image surface of the photographing module 5000. Preferably, the electronic device 50 can further include but not limited to a display, a control unit, a storage unit, a random access memory unit (RAM), a read-only memory unit (ROM) or a combination thereof.

6th Embodiment

Figure 6:
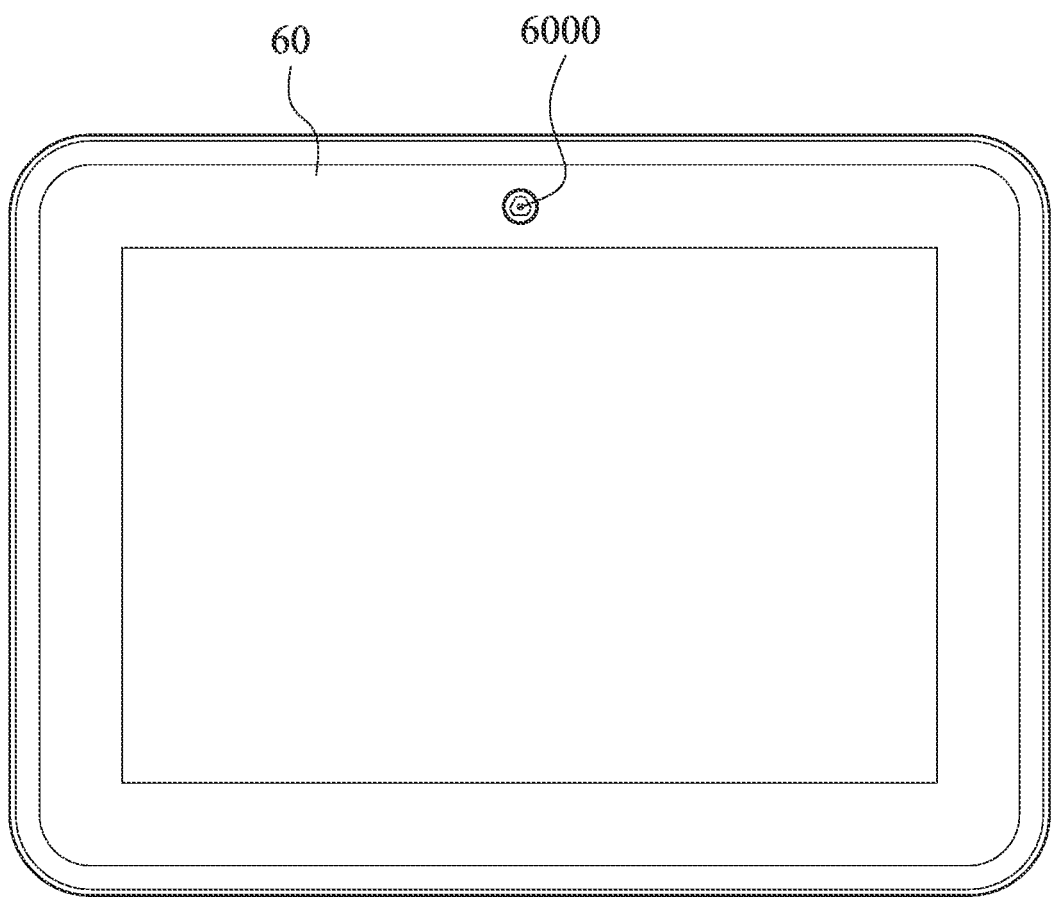
FIG. 6 shows an electronic device according to the 6th embodiment of the present disclosure.

FIG. 6 shows an electronic device 60 according to the 6th embodiment of the present disclosure. The electronic device 60 of the 6th embodiment is a tablet personal computer, wherein the electronic device 60 includes a photographing module 6000 according to the present disclosure.

7th Embodiment

Figure 7:
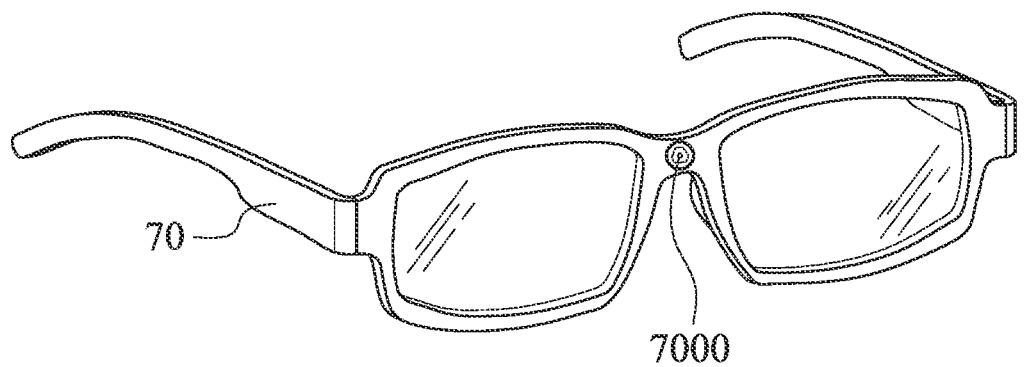
FIG. 7 shows an electronic device according to the 7th embodiment of the present disclosure.

FIG. 7 shows an electronic device 70 according to the 7th embodiment of the present disclosure. The electronic device 70 of the 7th embodiment is a wearable device, wherein the electronic device 70 includes a photographing lens module 7000 according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A photographing module, comprising:
an imaging lens assembly comprising a plurality of lens elements, wherein one of the lens elements is a lens element with a plastic peripheral portion, and at least one surface of an object-side surface and an image-side surface of the lens element with the plastic peripheral portion comprises:
an effective optical portion; and
the plastic peripheral portion surrounding the effective optical portion and comprising:
a plurality of rib structures, wherein each of the rib structures has a strip shape along a radial direction of an optical axis of the imaging lens assembly and is inclined relative to the optical axis, a cross-section in the radial direction of the optical axis of each of the rib structures is a triangle, and the strip shapes of the rib structures are arranged around the effective optical portion;
wherein each of the strip shapes is parallel with one of the radial directions.

2. The photographing module of claim 1, wherein the imaging lens assembly further comprises:
a light blocking sheet disposed between the lens element with the plastic peripheral portion and the lens element adjacent to the surface.

3. The photographing module of claim 2, wherein a thickness of the light blocking sheet is t, and the following condition is satisfied:

$0.005$ mm$<t<0.05$ mm.

4. The photographing module of claim 1, wherein a number of the lens elements of the imaging lens assembly is N, and the following condition is satisfied:

$4 \leq N$.

5. The photographing module of claim 1, wherein an Abbe number of the lens element with the plastic peripheral portion is V, and the following condition is satisfied:

$10 < V < 25$.

6. The photographing module of claim 1, wherein a greatest width of each of the strip shapes is w, and the following condition is satisfied:

$0.01$ mm$<w<0.10$ mm.

7. The photographing module of claim 1, wherein the other surface of the object-side surface and the image-side surface of the lens element with the plastic peripheral portion comprises:
a second fitting section connected to another one of the lens elements adjacent to the other surface for aligning the lens element with the plastic peripheral portion with the lens element adjacent to the other surface.

8. An electronic device, comprising:
the photographing module of claim 1.

* * * * *